(12) United States Patent
Dong

(10) Patent No.: US 12,280,634 B2
(45) Date of Patent: Apr. 22, 2025

(54) THERMAL MANAGEMENT SYSTEM WITH FIRST FLOW REGULATING DEVICE HAVING BI-DIRECTIONAL THROTTLING FUNCTION AND CONTROL METHOD THEREOF

(71) Applicant: HANGZHOU SANHUA RESEARCH INSTITUTE CO., LTD., Hangzhou (CN)

(72) Inventor: Junqi Dong, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 206 days.

(21) Appl. No.: 17/928,611

(22) PCT Filed: May 28, 2021

(86) PCT No.: PCT/CN2021/096958
§ 371 (c)(1),
(2) Date: Nov. 29, 2022

(87) PCT Pub. No.: WO2021/239137
PCT Pub. Date: Dec. 2, 2021

(65) Prior Publication Data
US 2023/0271478 A1    Aug. 31, 2023

(30) Foreign Application Priority Data

May 29, 2020    (CN) .......................... 202010482617.7

(51) Int. Cl.
B60H 1/00    (2006.01)

(52) U.S. Cl.
CPC ..... B60H 1/00907 (2013.01); B60H 1/00278 (2013.01); B60H 2001/00307 (2013.01);
(Continued)

(58) Field of Classification Search
CPC ............ B60H 1/00907; B60H 1/00278; B60H 1/00392; B60H 1/00271; B60H 1/034;
(Continued)

(56) References Cited

U.S. PATENT DOCUMENTS 5,722,250 A * 3/1998 Pomme .............. B60H 1/00907
62/244
7,370,486 B2 * 5/2008 Grimm .................. B60H 1/032
62/239

(Continued)

FOREIGN PATENT DOCUMENTS

CN            1231242 A    10/1999
CN         101004301 A     7/2007
(Continued)

*Primary Examiner* — Emmanuel E Duke
(74) *Attorney, Agent, or Firm* — Cheng-Ju Chiang

(57) ABSTRACT

A thermal management system includes a refrigerant system and a coolant system. The refrigerant system includes a compressor, an indoor heat exchanger, a first flow regulating device, a first heat exchanger and an outdoor heat exchanger. The outdoor heat exchanger includes a first port and a second port. The first flow regulating device has a bi-directional throttling function. The first heat exchanger includes a first heat exchange section and a second heat exchange section. The thermal management system has a heating mode and a cooling mode which can be achieved by the same first flow regulating device. A control method of the thermal management system is also disclosed.

20 Claims, 17 Drawing Sheets

(52) U.S. Cl.
  CPC .............. *B60H 2001/00928* (2013.01); *B60H 2001/00935* (2013.01); *B60H 2001/00957* (2013.01)

(58) Field of Classification Search
  CPC ...... B60H 1/32284; B60H 2001/00307; B60H 2001/00928; B60H 2001/00935; B60H 2001/00957; B60H 2001/00949; B60K 2001/003; B60K 11/02
  See application file for complete search history.

(56) References Cited

U.S. PATENT DOCUMENTS

| | | | |
|---|---|---|---|
| 2011/0284181 A1* | 11/2011 | Rached | B60H 1/3204 252/67 |
| 2012/0174602 A1* | 7/2012 | Olivier | B60H 1/32284 62/238.1 |
| 2020/0018222 A1 | 1/2020 | Tholander et al. | |

FOREIGN PATENT DOCUMENTS

| | | | | |
|---|---|---|---|---|
| CN | 101074692 | A | | 11/2007 |
| CN | 101545690 | A | | 9/2009 |
| CN | 103129348 | A | | 6/2013 |
| CN | 106004329 | A * | 10/2016 | ......... B60H 1/00899 |
| CN | 107499091 | A * | 12/2017 | ......... B60H 1/00278 |
| CN | 108248331 | A | | 7/2018 |
| CN | 109449536 | A * | 3/2019 | .......... H01M 10/613 |
| CN | 209022713 | U | | 6/2019 |
| CN | 110816218 | A | | 2/2020 |
| CN | 110966792 | A | | 4/2020 |
| CN | 112428768 | A | | 3/2021 |
| CN | 112428769 | A | | 3/2021 |
| CN | 112428771 | A | | 3/2021 |
| CN | 212950033 | U | | 4/2021 |
| EP | 3845831 | A1 | | 7/2021 |
| JP | 2000-52754 | A | | 2/2000 |
| JP | 2018-75921 | A | | 5/2018 |
| JP | 2020-40430 | A | | 3/2020 |
| WO | 03/051657 | A1 | | 6/2003 |

* cited by examiner

THERMAL MANAGEMENT SYSTEM WITH FIRST FLOW REGULATING DEVICE HAVING BI-DIRECTIONAL THROTTLING FUNCTION AND CONTROL METHOD THEREOF

CROSS-REFERENCE TO RELATED APPLICATION

This application is a 35 U.S.C. § 371 National Phase conversion of International (PCT) Patent Application No. PCT/CN2021/096958, filed on May 28, 2021, which claims priority of a Chinese Patent Application No. 202010482617.7, filed on May 29, 2020 and titled "THERMAL MANAGEMENT SYSTEM", the entire content of which is incorporated herein by reference. The PCT International Patent Application was filed and published in Chinese.

TECHNICAL FIELD

The present application relates to the technical field of thermal management, and in particular to a thermal management system and a control method of the thermal management system.

BACKGROUND

A thermal management system of a vehicle enables cooling, heating, air exchange and air purification of an indoor air to provide a comfortable environment for the indoor personnel. How to optimize the thermal management system in order to improve the performance of the thermal management system is a current focus.

In the related thermal management system, different throttle valves are required to realize in two operating modes of heating and cooling, respectively, and the structure of thermal management system is complicated and costly.

SUMMARY

In view of the above-mentioned problems of related technologies, the present application provides a thermal management system with a simple structure and a control method of the thermal management system.

In order to achieve the above purpose, the present application adopts the following technical solution: a thermal management system, including: a refrigerant system and a coolant system; the refrigerant system including a compressor, an indoor heat exchanger, a first flow regulating device, a first heat exchanger and an outdoor heat exchanger; the outdoor heat exchanger including a first port of the outdoor heat exchanger and a second port of the outdoor heat exchanger; the first flow regulating device having a bi-directional throttling function; the first heat exchanger including a first heat exchange section and a second heat exchange section which are not communicated, the first heat exchange section and the second heat exchange section being configured to exchange heat;

the thermal management system including a heating mode and a cooling mode; in the heating mode, an outlet of the compressor, the indoor heat exchanger, the first flow regulating device, the outdoor heat exchanger, the first heat exchange section, and an inlet of the compressor being communicated to form a refrigerant circuit, the first flow regulating device being in a refrigerant throttling state, and a refrigerant in the first heat exchange section absorbing heat from a coolant in the second heat exchange section; in the cooling mode, the outlet of the compressor, the first heat exchange section, the outdoor heat exchanger, the first flow regulating device, the indoor heat exchanger, and the inlet of the compressor being communicated to form a refrigerant circuit, the first flow regulating device being in a refrigerant throttling state, and the heat of the refrigerant in the first heat exchange section being transferred to the coolant in the second heat exchange section.

The present application also discloses the following technical solution: a control method of a thermal management system, the thermal management system including a refrigerant system, a coolant system and a controller;

the refrigerant system including a compressor, an indoor heat exchanger, a first flow regulating device, a first heat exchanger and an outdoor heat exchanger; the outdoor heat exchanger including a first port of the outdoor heat exchanger and a second port of the outdoor heat exchanger; the first flow regulating device having a bi-directional throttling function;

the first heat exchanger including a first heat exchange section and a second heat exchange section which are not communicated, the first heat exchange section and the second heat exchange section being configured to exchange heat;

the control method including controlling the thermal management system to work on a heating mode and a cooling mode under a control of the controller;

wherein in the heating mode, an outlet of the compressor, the indoor heat exchanger, the first flow regulating device, the outdoor heat exchanger, the first heat exchange section, and an inlet of the compressor being communicated to form a first refrigerant circuit, the first flow regulating device being in a refrigerant throttling state, and a refrigerant in the first heat exchange section absorbing heat from a coolant in the second heat exchange section;

in the cooling mode, the outlet of the compressor, the first heat exchange section, the outdoor heat exchanger, the first flow regulating device, the indoor heat exchanger, and the inlet of the compressor being communicated to form a second refrigerant circuit, the first flow regulating device being in a refrigerant throttling state, and the heat of the refrigerant in the first heat exchange section being transferred to the coolant in the second heat exchange section.

The present application also discloses the following technical solution: a vehicle thermal management system, including:

a refrigerant subsystem including a compressor, an indoor heat exchanger located in a vehicle air conditioning cabinet, a fluid switching device being used to change a flow direction of a refrigerant in the refrigerant subsystem, a bi-directional throttling valve being used to throttle the refrigerant in the refrigerant subsystem, and an outdoor heat exchanger located at an outside of the vehicle air conditioning cabinet; the compressor, the indoor heat exchanger, the fluid switching device, the bi-directional throttling valve, and the outdoor heat exchanger being connected and being in fluid communication relationship for circulating the refrigerant; and a controller electrically connecting with the bi-directional throttling valve, the vehicle thermal management system being configured in a heating mode or a cooling mode by the controller;

wherein the heating mode and the cooling mode shares the same bi-directional throttling valve.

The first flow regulating device of the thermal management system and the control method of the present application has the bi-directional throttling function, and the heating mode and the cooling mode of the thermal management system can be achieved by a same first flow regulating device, thereby simplifying the structure of the thermal management system and reducing the cost.

DETAILED DESCRIPTION

Exemplary embodiments will be described herein in detail, examples of which are represented in the accompanying drawings. Where the following description relates to the accompanying drawings, the same numerals in different accompanying drawings indicate the same or similar elements unless otherwise indicated. The embodiments described in the following exemplary embodiments do not represent all embodiments consistent with the present application. Rather, they are only examples of devices and methods that are consistent with some aspects of the present application as detailed in the appended claims.

The terms used in this application are intended to describe particular embodiments only and are not intended to limit this application. The singular forms of "a", "said" and "the" as used in this application and the appended claims are also intended to include plural forms, unless the context clearly dictates otherwise.

It should be understood that "first", "second" and similar words used in the specification and claims of the present application do not indicate any order, quantity or importance, but are only used to distinguish different components. Similarly, similar words such as "a" or "an" do not mean a quantity limit, but mean that there is at least one. "A plurality of" means a quantity of two or more. Unless otherwise indicated, similar words such as "front", "rear", "lower" and/or "upper" are only for convenience of description, and are not limited to one position or one spatial orientation. Terms such as "including" or "comprising" and other similar words mean that the elements or components before "including" or "comprising" now cover the elements or components listed after "including" or "comprising" and their equivalents, and do not exclude other elements or components.

Thermal management systems of the exemplary embodiments of the present application are described in detail below in conjunction with the accompanying drawings. The thermal management systems provided in the embodiments of the present application can all be used in electric vehicles. Without conflict, the features in the following embodiments and implementations may complement each other or be combined with each other.

Figure 1:
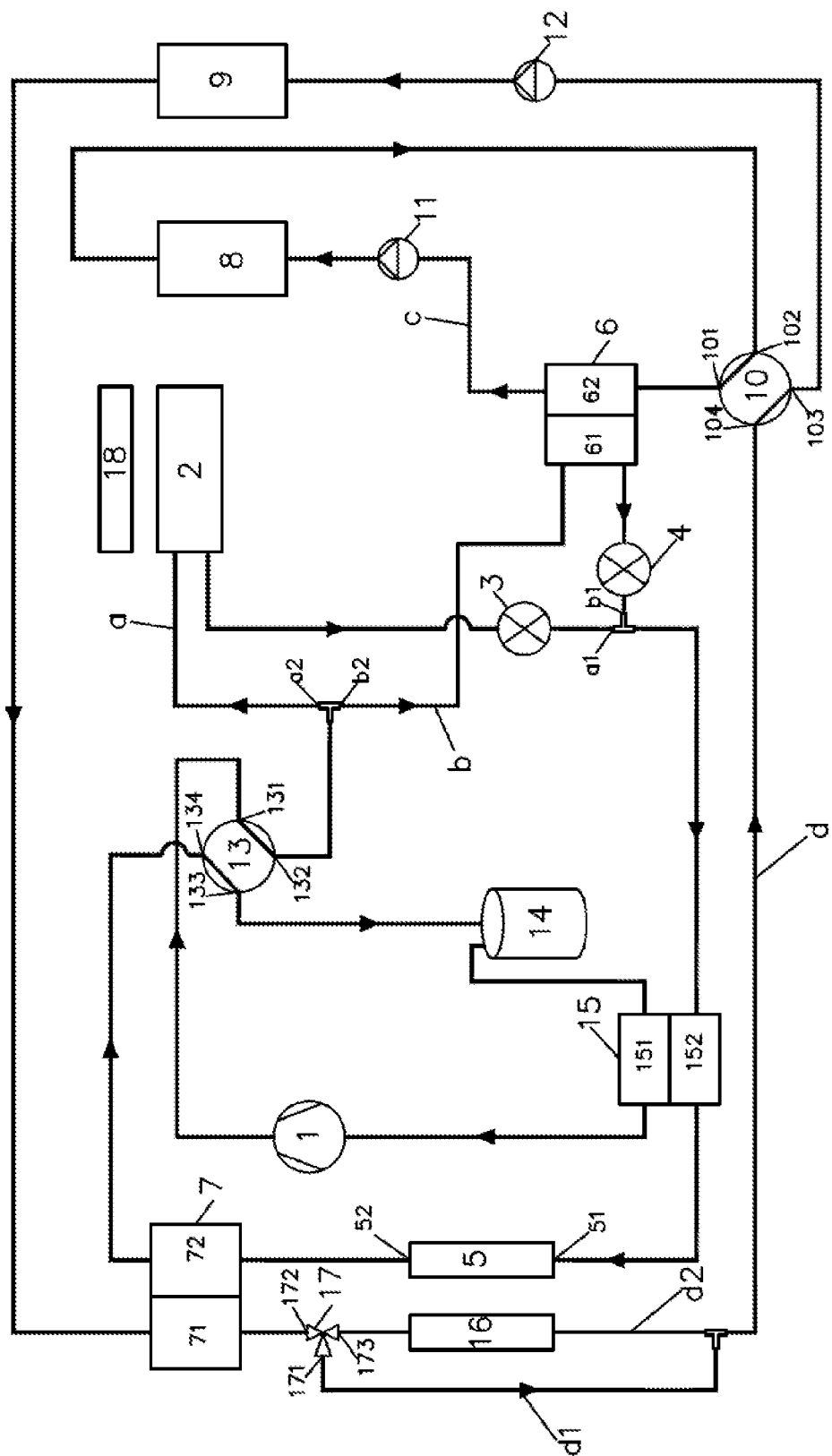
FIG. 1 is a schematic diagram of a working principle of a thermal management system in a first heating mode according to an embodiment of the present application.

According to a specific embodiment of a thermal management system of the present application, referring to FIG. 1, the thermal management system includes a compressor 1, an indoor heat exchanger 2, a first flow regulating device 3, a second flow regulating device 4, an outdoor heat exchanger 5, a second heat exchanger 6, a first heat exchanger 7, a battery heat exchange assembly 8, a motor heat exchange assembly 9, a first fluid switching device 10, a first fluid driving device 11, a second fluid driving device 12, a third fluid switching device 13, a gas-liquid separator 14, a third heat exchanger 16, a second fluid switching device 17, and a heating device 18.

The first heat exchanger 7 includes a first heat exchange section 72 and a second heat exchange section 71 which are capable of exchanging heat with each other. Both the first heat exchange section 72 and the second heat exchange section 71 are provided with a flow channel. The flow channel of the first heat exchange section 72 and the flow channel of the second heat exchange section 71 are separated from each other, and are not communicated. The second heat exchanger 6 includes a third heat exchange section 61 and a fourth heat exchange section 62 which are capable of exchanging heat with each other. Both the third heat exchange section 61 and the fourth heat exchange section 62 are provided with a flow channel. The flow channel of the third heat exchange section 61 and the flow channel of the fourth heat exchange section 62 are separated from each other, and are not communicated. A refrigerant can be heat exchanged with a coolant through the first heat exchanger 7. The first heat exchanger 7 may be a plate heat exchanger, a shell-and-tube liquid-cooled heat exchanger, or other liquid-cooled heat exchanger. The refrigerant may be heat exchanged with the coolant through the second heat exchanger 6. The second heat exchanger 6 may be a plate heat exchanger, a shell-and-tube liquid-cooled heat exchanger, or other liquid-cooled heat exchanger. The second heat exchanger 6 and the first heat exchanger 7 may be the same or different.

Figure 17:
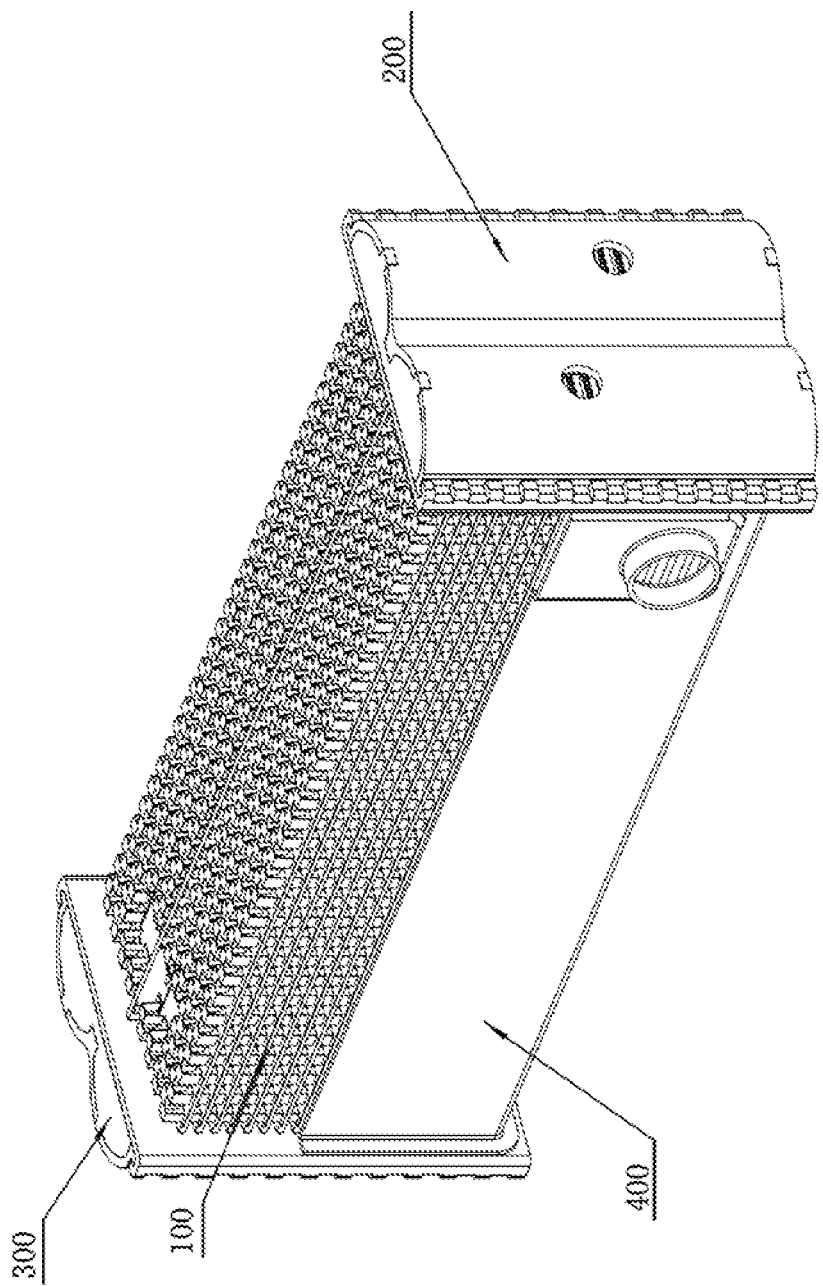
FIG. 17 is a partial schematic view of a perspective structure of a shell-and-tube liquid-cooled heat exchanger.

When a high pressure refrigerant (e.g. $CO_2$ refrigerant) is used as the refrigerant, both the second heat exchanger 6 and the first heat exchanger 7 are selected as shell-and-tube liquid-cooled heat exchangers. Compared to plate heat exchangers, shell-and-tube liquid-cooled heat exchangers are more pressure resistant and have lower risk of bursting. Referring to FIG. 17, the shell-and-tube liquid-cooled heat exchanger includes a plurality of microchannel flat tubes 100 arranged side by side, a first collector 200 attached to one end of the microchannel flat tubes 100, a second collector 300 attached to the other end of the microchannel flat tubes 100, and a shell 400 enclosing the microchannel flat tubes 100 and located between the two collectors. The refrigerant may flow from one cavity of the first collector 200 on one side and then flow through a portion of the microchannel flat tubes 100 to the second collector 300 on the other side. Then, the refrigerant flows out of the other cavity of the first collector 200 after passing through another portion of the microchannel flat tubes 100. The coolant flows in a gap between the cavity formed by the shell 400 and the microchannel flat tubes 100, thereby achieving heat exchange between the refrigerant and the coolant.

A circuit communicating with the compressor 1 is a refrigerant circuit. A circuit communicating with the first fluid driving device 11 and the second fluid driving device 12 is a coolant circuit. The flow channel of the third heat exchange section 61 is used to circulate the refrigerant. The flow channel of the fourth heat exchange section 62 is used to circulate the coolant. The flow channel of the first heat exchange section 72 is used to circulate the refrigerant. The flow channel of the second heat exchange section 71 is used to circulate the coolant. The refrigerant may be R134A or carbon dioxide or other heat transfer medium. The coolant may be a mixture of ethanol and water. The first fluid driving device 11 and the second fluid driving device 12 may be a device such as an electronic water pump to drive the flow of liquid.

Components of the thermal management system are connected by pipelines so as to form two major subsystems, which are a refrigerant system and a coolant system, respectively. The refrigerant of the refrigerant system and the coolant of the coolant system are isolated from each other, and do not circulate. The flow channel of the third heat exchange section 61 and the flow channel of the first heat exchange section 72 are connected in the refrigerant system. The flow channel of the fourth heat exchange section 62 and the flow channel of the second heat exchange section 71 are connected in the coolant system.

It should be explained that the description of "the flow channel of the third heat exchange section 61 and the flow channel of the first heat exchange section 72 are connected in the refrigerant system" means that the refrigerant in the refrigerant system can flow into and out of the flow channel of the third heat exchange section 61 and the flow channel of the first heat exchange section 72; the third heat exchange section 61 and the first heat exchange section 72 can be connected in the components of the refrigerant system through pipelines; and when the thermal management system is in operation, a circuit is formed by connecting the pipelines. Description of "the flow channel of the fourth heat exchange section 62 and the flow channel of the second heat exchange section 71 are connected in the coolant system" means that the coolant in the coolant system can flow into and out of the flow path of the fourth heat exchange section 62 and the flow path of the second heat exchange section 71; the fourth heat exchange section 62 and the second heat exchange section 71 can be connected to the components of the coolant system through pipelines; and when the thermal management system is in operation, a circuit is formed by connecting the pipelines.

The refrigerant system includes: the compressor 1, the indoor heat exchanger 2, the first flow regulating device 3, the second flow regulating device 4, the outdoor heat exchanger 5, the third heat exchange section 61 of the second heat exchanger 6, the first heat exchange section 72 of the first heat exchanger 7, the third fluid switching device 13 and the gas-liquid separator 14. The above components can be indirectly connected to each other through pipelines or valve members.

The refrigerant system includes a first branch a and a second branch b. The first flow regulating device 3 and the indoor heat exchanger 2 are located in the first branch a. The second flow regulating device 4 and the third heat exchanger 61 are located in the second branch b. Optionally, the first flow regulating device 3 and the second flow regulating device 4 can be bi-directional throttling valves. The first flow regulating device 3 and the second flow regulating device 4 can also be a combination of other valve elements, which have conduction, cut-off and bi-directional throttling functions.

The first branch a includes a first end a1 of the first branch and a second end a2 of the first branch. The second branch b includes a first end b1 of the second branch and a second end b2 of the second branch. Both the first end a1 of the first branch and the first end b1 of the second branch are connected to a first port 51 of the outdoor heat exchanger. The first flow regulating device 3 is connected between the first port 51 of the outdoor heat exchanger and the indoor heat exchanger 2. In this embodiment, the indoor heat exchanger 2 is provided with only one heat exchanger. The second flow regulating device 4 of the second branch b is connected between the first port 51 of the outdoor heat exchanger and the third heat exchange section 61 of the second heat exchanger 6. Depending on the operating mode of the thermal management system, in some modes (e.g. a cooling mode), a second port 52 of the outdoor heat exchanger communicates with the outlet of the compressor 1; the first heat exchange section 72 is connected between the outdoor heat exchanger 5 and the compressor 1; and the second end a2 of the first branch and the second end b2 of the second branch both communicate with the inlet of the compressor 1. In some other modes (e.g. a heating mode), the second port 52 of the outdoor heat exchanger communicates with the inlet of the compressor 1; the first heat exchange section 72 is connected between the outdoor heat exchanger 5 and the compressor 1; and the second end a2 of the first branch and the second end b2 of the second branch both communicate with the outlet of the compressor 1.

The first end a1 of the first branch, the first end b1 of the second branch and the outdoor heat exchanger 5 may be connected to each other with a tee pipe. The second end a2 of the first branch, the second end b2 of the second branch and the compressor 1 may be connected to each other with a tee pipe. In some embodiments, a plurality of stop valves, or a three-way valve or a plurality of valve assemblies may be provided between two ports of the outdoor heat exchanger 5, between the inlet and the outlet of the compressor 1, between two ends of the first branch a, and between two ends of the second branch b, thereby enabling the flow control of the refrigerant in the refrigerant system.

In this embodiment, the thermal management system switches the refrigerant flow in the refrigerant system through the third fluid switching device 13. Optionally, the third fluid switching device 13 may be a four-way valve or a combination of multiple valve members. In this embodiment, the third fluid switching device 13 is a four-way valve. Specifically, the third fluid switching device 13 includes a first connection port 131, a second connection port 132, a third connection port 133 and a fourth connection port 134; the first connection port 131 and the outlet of the compressor 1 are connected by a pipeline; the second end a2 of the first branch and the second end b2 of the second branch are both connected to the second connection port 132 by a pipeline; the third connection port 133 is connected to an inlet of the gas-liquid separator 14 by a pipeline; an outlet of the gas-liquid separator 14 is connected to the inlet of the compressor 1 by a pipeline; and the fourth connection port 134 is connected to the second port 52 of the outdoor heat exchanger by a pipeline. In some embodiments, the gas-liquid separator 14 may not be provided, and the third connection port 133 is directly connected to the inlet of the compressor 1 by a pipeline.

The third fluid switching device 13 includes a first operating mode and a second operating mode. In the first operating mode, the first connection port 131 and the second connection port 132 are communicated, and the third connection port 133 and the fourth connection port 134 are communicated. In the second operating mode, the first connection port 131 and the fourth connection port 134 are communicated, and the second connection port 132 and the third connection port 133 are communicated.

The coolant system includes the battery heat exchange assembly 8, the first fluid driving device 11, the fourth heat exchange section 62, the motor heat exchange assembly 9, the first fluid switching device 10, the second heat exchange section 71, the third heat exchanger 16, and the second fluid switching device 17.

The coolant system includes a first flow path c and a second flow path d. By switching the state of the first fluid switching device 10, the first flow path c and the second flow path d can be set in series or in parallel. That is, the first flow path c and the second flow path d can form circuits to operate independently of each other, or can be communicated to each other to form a circuit to operate together. The first fluid switching device 10 includes a first port 101, a second port 102, a third port 103 and a fourth port 104; one end of the first flow path c is connected to the first port 101; the other end of the first flow path c is connected to the second port 102; one end of the second flow path d is connected to the third port 103; and the other end of the second flow path d is connected to the fourth port 104.

The battery heat exchange assembly 8, the fourth heat exchange section 62 and the first fluid driving device 11 are provided in the first flow path c. When the thermal management system is operating, the flow channel of the fourth heat exchange section 62 is part of the coolant circuit. The second heat exchange section 71, the motor heat exchange assembly 9, the second fluid driving device 12, the third heat exchanger 16 and the second fluid switching device 17 are provided in the second flow path d. When the thermal management system is operating, the flow channel of the second heat exchange section 71 is part of the coolant circuit. The second flow path d includes a third branch d1 and a fourth branch d2 provided in parallel. The third branch d1 consists of pipelines, and the third heat exchanger 16 is provided in the fourth branch d2. Optionally, the third heat exchanger 16 may be a low-temperature water tank. The third heat exchanger 16 exchanges heat with the environment air, which can reduce the temperature of the coolant. The third branch d1 is connected between the first fluid switching device 10 and the second fluid switching device 17. The fourth branch d2 is connected between the first fluid switching device 10 and the second fluid switching device 17. The second fluid switching device 17 includes a fifth port 171, a sixth port 172 and a seventh port 173; One end of the third branch d1 is connected to the fifth port 171, and the other end of the third branch d1 is connected to the fourth port 104; one end of the fourth branch d2 is connected to the seventh port 173, and the other end of the fourth branch d2 is connected to the fourth port 104; and the sixth port 172 is connected to the second heat exchange section 71.

Figure 5:
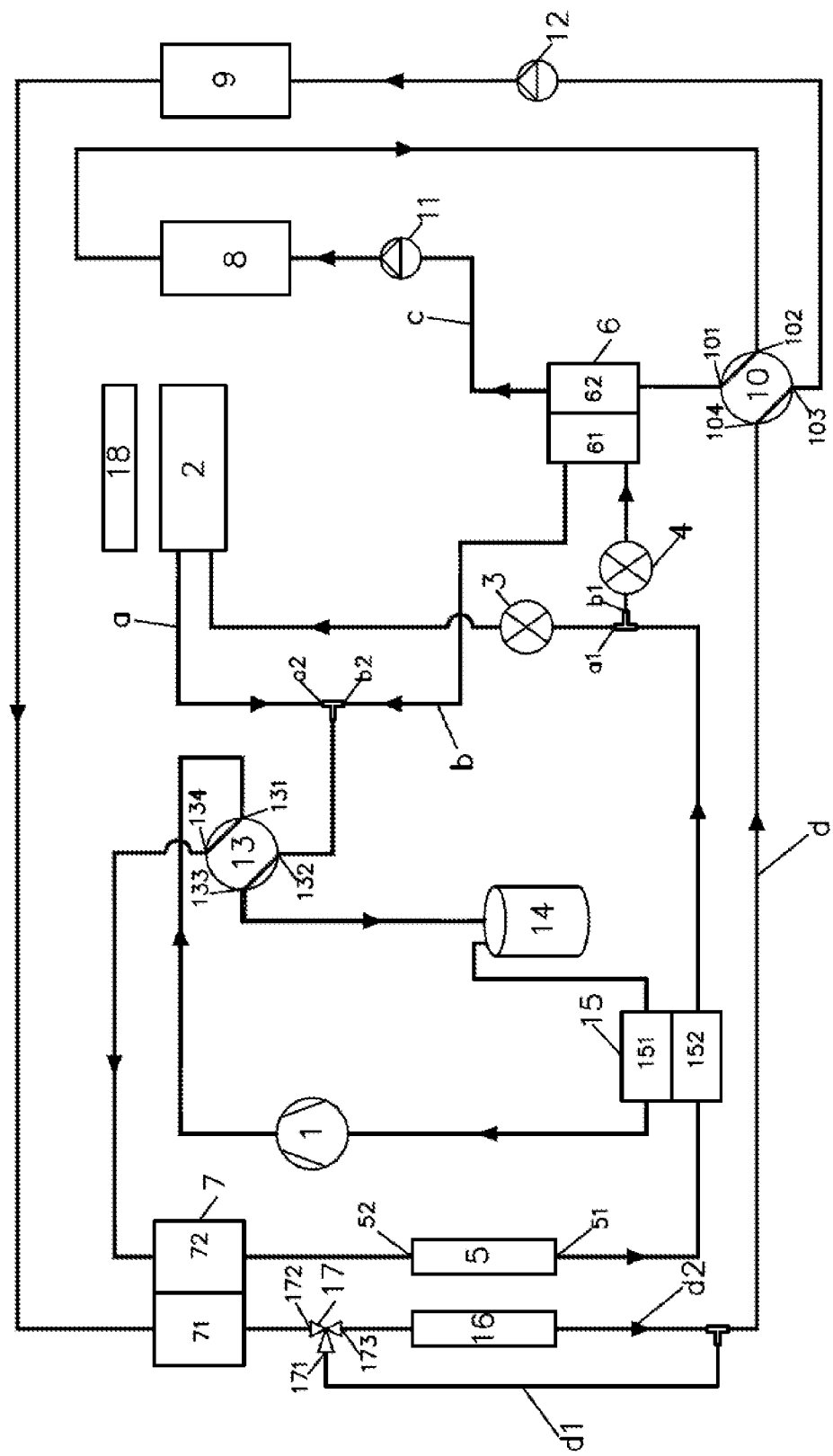
FIG. 5 is a schematic diagram of a working principle of the thermal management system in a first cooling mode according to an embodiment of the present application.

The coolant system has a first operating state and a second operating state. Referring to FIG. 1 and FIG. 5, in the first operating state, the first fluid switching device 10 is in a first communicating state where the first port 101 communicates with the second port 102; the third port 103 communicates with the fourth port 104. the first fluid driving device 11, the first fluid switching device 10, the fourth heat exchange section 62 and the battery heat exchange assembly 8 are communicated to form a first coolant circuit; the second fluid driving device 12, the motor heat exchange assembly 9, the second heat exchange section 71, the first fluid switching device 10 and the third branch d1 are communicated to form a second coolant circuit, or, the second fluid driving device 12, the motor heat exchange assembly 9, the second heat exchange section 71, the first fluid switching device 10 and the fourth branch d2 are communicated to form a second coolant circuit; the first coolant circuit and the second coolant circuit operate independently of each other. When the second flow regulating device 4 is not cut off, the coolant in the first coolant circuit is able to exchange heat with the refrigerant through the second heat exchanger 6, and the coolant in the second coolant circuit is able to exchange heat with the refrigerant through the first heat exchanger 7. When the second flow regulating device 4 is cut off, the coolant in the second coolant circuit is able to exchange heat with the refrigerant through the first heat exchanger 7. The first fluid driving device 11 is able to drive the coolant flow in the first coolant circuit; and the second heat exchanger 6 can be used to adjust the temperature of the battery heat exchange assembly 8. The second fluid driving device 12 is able to drive the coolant flow in the second coolant circuit; the third heat exchanger 16 and/or the first heat exchanger 7 can be used to adjust the temperature of the motor heat exchange assembly 9; and the coolant in the first coolant circuit is not in communication with the coolant in the second coolant circuit. In this case, the third branch d1 or the fourth branch d2 can be selectively communicated by setting the operating state of the second fluid switching device 17.

It is to be understood that in the first operating state and the second operating state of the coolant system, when the second flow regulating device 4 is cut off, the first fluid driving device 11 can be in an operating state, i.e., the coolant in the first flow path c is in a continuing flow state. However, since the second flow regulating device 4 is cut off, no heat exchange between the refrigerant and the coolant occurs at the second heat exchanger 6. At this time, the coolant in the first flow path c is in a continuing flow state, so that the thermal management system can measure the temperature of the battery heat exchange assembly 8 more accurately, thereby achieving more accurate thermal management of the battery heat exchange assembly 8. In addition, at this time the coolant is in the continuing flow state, the battery heat exchange assembly 8 can perform heat exchange with the coolant.

Referring to FIGS. 3, 7, 10, 12, in the second operating state, the first fluid switching device 10 is in a second communicating state where the first port 101 communicates with the fourth port 104; the second port 102 communicates with the third port 103. The second fluid driving device 12, the motor heat exchange assembly 9, the second heat exchange section 71, the first fluid switching device 10, the fourth heat exchange section 62, the battery heat exchange assembly 8, the first fluid driving device 11 and the third branch d1 are communicated to form a third circuit, or, the second fluid driving device 12, the motor heat exchange assembly 9, the second heat exchange section 71, the first fluid switching device 10, the fourth heat exchange section 62, the battery heat exchange assembly 8, the first fluid driving device 11 and the fourth branch d2 are communicated to form a third circuit; the first flow path c and the second flow path d are connected in series through the first fluid switching device 10. When the second flow regulating device 4 is not cut off, the coolant is able to exchange heat with the refrigerant through the second heat exchanger 6 and the first heat exchanger 7, respectively. When the second flow regulating device 4 is cut off, the coolant is able to exchange heat with the refrigerant through the first heat exchanger 7. The first fluid driving device 11 and the second fluid driving device 12 jointly drive the coolant to flow in the third circuit. At this time, the third branch d1 or the fourth branch d2 can be selectively communicated by setting the operating state of the second fluid switching device 17.

When the fourth branch d2 is connected in the coolant circuit, i.e., the third heat exchanger 16 is connected in the coolant circuit, the purpose of lowering the temperature of the coolant can be achieved by exchanging heat with the air through the third heat exchanger 16. As a result, the temperature of the motor heat exchange assembly 9 and the battery heat exchange assembly 8 can be reduced.

In this embodiment, the thermal management system also includes a heating device 18 located adjacent to the indoor heat exchanger 2. The heating device 18 is located on a downstream side of an air flow with respect to the indoor heat exchanger 2. The heating device 18 can be an air-cooled PTC heater or a liquid-cooled PTC heater. The indoor heat exchanger 2 and the heating device 18 are provided in a vehicle air conditioning cabinet. A front-end module consisting of the outdoor heat exchanger 5 and the third heat exchanger 16 (the low-temperature water tank) is disposed near a front air grille of the vehicle. The compressor 1 and the gas-liquid separator 14 are disposed in the engine compartment in front of the cab.

The thermal management system of this embodiment has multiple operating modes, including a heating mode, a cooling mode, a heating and dehumidifying mode, a defrosting mode, and a heat dissipation mode. The outdoor heat exchanger 5 can be used as an evaporator or condenser in the different operating modes. The indoor heat exchanger 2 and the heating device 18 are able to exchange heat with the air entering the air conditioning cabinet of the passenger compartment. The indoor heat exchanger 2 and the heating device 18 are provided in the air conditioning cabinet. A blower may also be provided in the air conditioning cabinet for conveying air. The indoor heat exchanger 2 can be used as a condenser in the heating mode, and can be used as an evaporator in the cooling mode, thereby adjusting the air temperature in the passenger compartment.

The thermal management system of this embodiment is applicable not only to vehicles, but also to other heat exchange systems that require thermal management. For the convenience of description, the description of the present application takes a vehicle as an example for description.

As shown in FIGS. 1 to 4, the passenger compartment has a heating demand when the environment temperature is low. Depending on whether the motor heat exchange assembly 9 and the battery heat exchange assembly 8 have a heat dissipation demand, the state of the second flow regulating device 4, the first fluid switching device 10 and the second fluid switching device 17 can be adjusted. The coolant system performs the functions of heating the battery heat exchange assembly 8 and recovering the residual heat of the motor heat exchange assembly 9; not exchanging heat with the refrigerant circuit of the battery heat exchange assembly 8 and recovering the residual heat of the motor heat exchange assembly 9; dissipating both the battery heat exchange assembly 8 and the motor heat exchange assembly 9 into the environment; and not exchanging heat with the refrigerant circuit of the battery heat exchange assembly 8 and dissipating the heat of the motor heat exchange assembly 9. The thermal management system has a first heating mode and a second heating mode depending on whether the battery heat exchanger module 8 has a heating demand. The second heating mode includes a first state of the second heating mode, a second state of the second heating mode, and a third state of the second heating mode, according to whether the battery heat exchange assembly 8 and the motor heat exchange assembly 9 have a heat dissipation demand.

Referring to FIG. 1, when both the passenger compartment and the battery heat exchange assembly 8 have a heating demand, and the motor heat exchange assembly 9 has residual heat to recover, the thermal management system is in the first heating mode, where the second port 52 of the outdoor heat exchanger communicates with the inlet of the compressor 1; the second end a2 of the first branch and the second end b2 of the second branch both communicate with the outlet of the compressor 1; the third fluid switching device 13 is in the first operating mode; and the first flow regulating device 3 and the second flow regulating device 4 are both in throttling mode. The compressor 1, the indoor heat exchanger 2, the first flow regulating device 3, the outdoor heat exchanger 5, the first heat exchange section 72 and the gas-liquid separator 14 are communicated to form a refrigerant circuit; and the compressor 1, the third heat exchanger 61, the second flow regulating device 4, the outdoor heat exchanger 5, the first heat exchanger 72 and the gas-liquid separator 14 are communicated to form a refrigerant circuit.

At this time, the coolant system is in the first operating state, the first flow path c and the second flow path d are in parallel; the fifth port 171 of the second fluid switching device 17 communicates with the sixth port 172; and the third branch d1 is connected in the coolant circuit. The first fluid driving device 11, the first fluid switching device 10, the fourth heat exchange section 62 and the battery heat exchange assembly 8 are communicated to form a first coolant circuit; and the second fluid driving device 12, the motor heat exchange assembly 9, the second heat exchange section 71, the third branch d1 and the first fluid switching device 10 are communicated to form a second coolant circuit. The refrigerant exchanges heat with the coolant in the first coolant circuit through the second heat exchanger 6, and the refrigerant exchanges heat with the coolant in the second coolant circuit through the first heat exchanger 7.

The high-temperature refrigerant compressed by the compressor 1 passing through the third fluid switching device 13 are divided into two paths, in which one path flows to the first branch a and the other path flows to the second branch b. The refrigerant enters the indoor heat exchanger 2 connected in the first branch a. The indoor heat exchanger 2 is used as a condenser. The refrigerant exchanges heat with the air in the passenger compartment, thereby heating the air entering the passenger compartment for the purpose of heating the passenger compartment. The refrigerant enters the third heat exchange section 61 connected in the second branch b. The refrigerant in the third heat exchange section 61 exchanges heat with the coolant in the fourth heat exchange section 62. The higher temperature refrigerant transfers heat to the coolant, which warms up the coolant. The heated coolant flows to the battery heat exchange assembly 8 under the drive of the first fluid driving device 11, thereby heating the battery heat exchange assembly 8. The refrigerant flowing out of the indoor heat exchanger 2 is throttled and cooled down by the first flow regulating device 3. The refrigerant flowing out of the third heat exchange section 61 is throttled and cooled down by the second flow regulating device 4. The two refrigerants converge and then flow to the outdoor heat exchanger 5. The low-temperature refrigerant in the gas-liquid phase absorbs the heat of the air in the outdoor heat exchanger 5. The refrigerant flowing out of the outdoor heat exchanger 5 flows into the first heat exchange section 72. The refrigerant in the first heat exchange section 72 exchanges heat with the coolant in the second heat exchange section 71. The higher temperature coolant transfers heat to the refrigerant. The refrigerant absorbs the heat from the coolant again in the first heat exchanger 7, so as to realize the residual heat recovery of the motor. Finally, after passing through the third fluid switching device 13 and the gas-liquid separator 14, the refrigerant returns to the compressor 1, and the cycle is repeated in this way.

In some embodiments, the outdoor heat exchanger 5 includes two connection ports. The two refrigerants can also converge directly in the outdoor heat exchanger 5. After the refrigerant absorbs the heat of the air in the outdoor heat exchanger 5, it then absorbs the heat of the coolant in the first heat exchanger 7, the dryness of the refrigerant increases and the refrigerant finally flows to the gas-liquid separator 14. The gas-liquid separator 14 is used to separate the refrigerant in the gas-liquid two-phase state into gaseous refrigerant and liquid refrigerant. The liquid refrigerant is stored in the gas-liquid separator 14 and the gaseous refrigerant flows to the compressor 1, thereby reducing the risk of liquid strike of the compressor. In some embodiments, when there is a liquid storage tank in the compressor 1 or when the refrigerant is all in gaseous state after heat absorption by the outdoor heat exchanger 5, the gas-liquid separator 14 may not be provided, and the refrigerant returns directly to the compressor 1.

Both the motor heat exchange assembly 9 and the battery heat exchange assembly 8 have a better operating temperature range, in which the efficiency is higher and the safety is higher. When the environment temperature is low and the temperature of the battery heat exchanger module 8 is also low, both the passenger compartment and the battery heat exchanger module 8 have heating demands. In the first heating mode, on the one hand, the battery heat exchanger module 8 is heated by the temperature of the refrigerant through the second heat exchanger 6, so that the battery heat exchanger module 8 reaches a better operating temperature. Compared to heating the battery heat exchange assembly 8 with a high-pressure water circuit PTC electric heater, the high-pressure water circuit PTC electric heater in the coolant circuit can be eliminated, thus reducing costs and improving safety. On the other hand, the refrigerant flowing out of the outdoor heat exchanger 5 absorbs the heat of the coolant through the first heat exchanger 7, and then returns to the compressor 1, which can improve the coefficient of performance (COP) and heating capacity of the system, and can also achieve the purpose of cooling down the motor.

Figure 2:
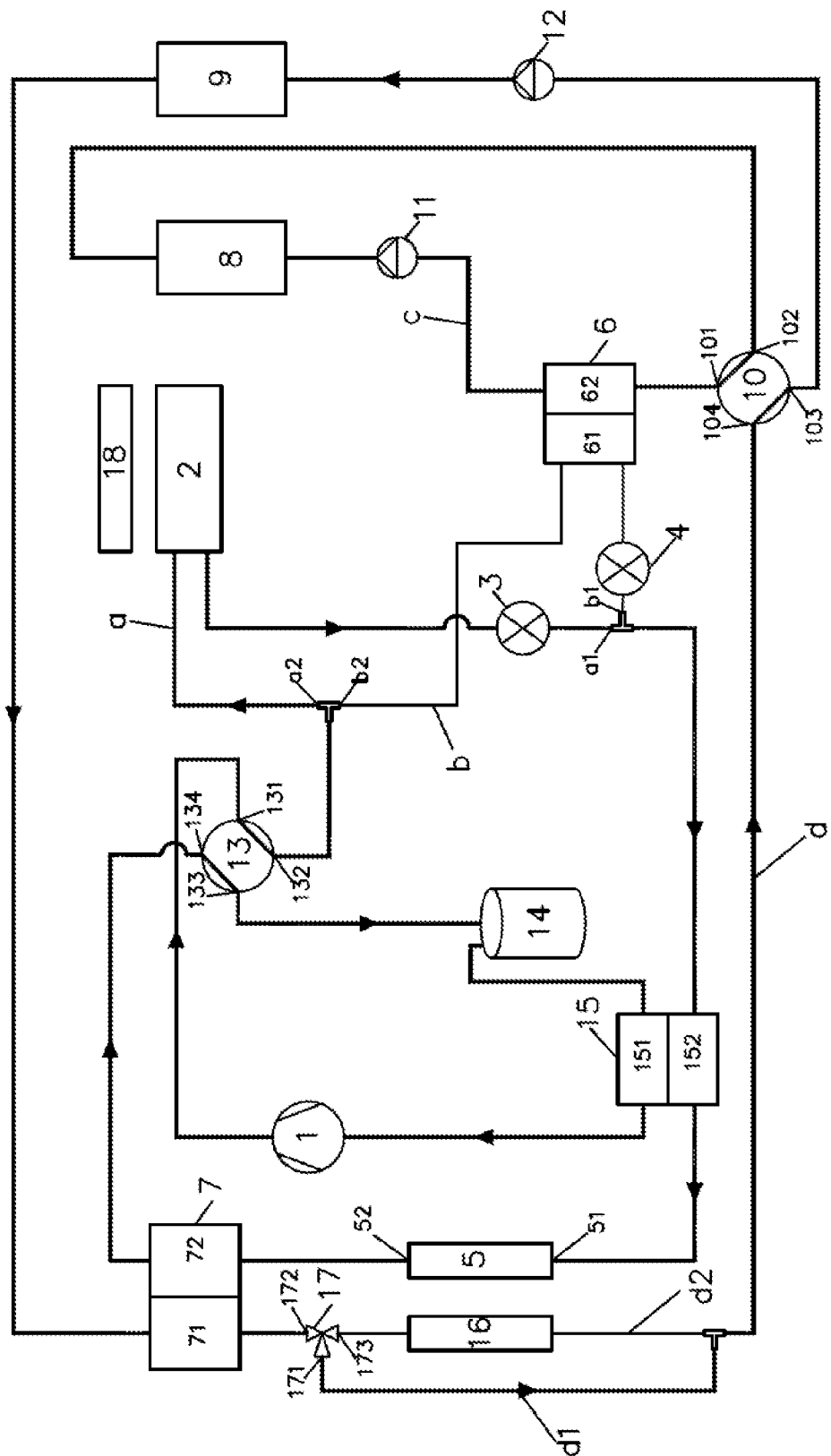
FIG. 2 is a schematic diagram of a working principle of the thermal management system in a first state of a second heating mode according to an embodiment of the present application.

Referring to FIG. 2, when the battery heat exchange assembly 8 is operating in the better operating temperature range, and only the passenger compartment has a heating demand and the motor heat exchange assembly 9 has residual heat to recover, the thermal management system is in the first state of the second heating mode. The second port 52 of the outdoor heat exchanger communicates with the inlet of the compressor 1; the second end a2 of the first branch a communicates with the outlet of the compressor 1; the third fluid switching device 13 is in the first operating mode; the first flow regulating device 3 is in a throttling state; and the second flow regulating device 4 is in a cut-off state. The compressor 1, the indoor heat exchanger 2, the first flow regulating device 3, the outdoor heat exchanger 5, the first heat exchange section 72 and the gas-liquid separator 14 are communicated to form a refrigerant circuit.

At this time, the coolant system is in the first operating state, and the second flow regulating device 4 is in the cut-off state. There is no heat exchange between the refrigerant and the coolant in the second heat exchanger 6. The second fluid driving device 12 in the second flow path d provides power for circulating flow of the coolant, and the fifth port 171 of the second fluid switching device 17 communicates with the sixth port 172. The third branch d1 is connected in the coolant circuit. The second fluid driving device 12, the motor heat exchange assembly 9, the second heat exchange section 71, the third branch d1 and the first fluid switching device 10 are communicated to form a coolant circuit. The refrigerant exchanges heat with the coolant through the first heat exchanger 7. It can be understood that, at this time, the first fluid driving device 11 can be in operating condition, that is, the first fluid driving device 11 provides power for circulating flow of the coolant. At this time, the first fluid driving device 11, the first fluid switching device 10, the fourth heat exchange section 62 and the battery heat exchange assembly 8 are communicated to form a coolant circuit, but the coolant does not exchange heat with the refrigerant.

The high-temperature refrigerant compressed by the compressor 1 flows to the first branch a after passing through the third fluid switching device 13. The refrigerant enters the indoor heat exchanger 2 connected in the first branch a. The indoor heat exchanger 2 is used as a condenser. The refrigerant exchanges heat with the air, thereby heating the air entering the passenger compartment for the purpose of heating the passenger compartment. The refrigerant flowing out of the indoor heat exchanger 2 is throttled and cooled down by the first flow regulating device 3, and then flows to the outdoor heat exchanger 5. The low-temperature refrigerant in the gas-liquid phase absorbs heat from the air in the outdoor heat exchanger 5. The refrigerant flowing out of the outdoor heat exchanger 5 flows into the first heat exchange section 72. The higher temperature coolant in the second heat exchange section 71 transfers heat to the refrigerant in the first heat exchange section 72. By circulating the coolant circuit, the residual heat recovery of the motor is thus achieved. Finally, after passing through the third fluid switching device 13 and the gas-liquid separator 14, the refrigerant returns to the compressor 1, and the cycle is repeated in this way.

In the first state of the second heating mode, the refrigerant flowing out of the outdoor heat exchanger 5 returns to the compressor 1 after absorbing heat from the motor heat exchange assembly 9 through the first heat exchanger 7, which can improve the coefficient of performance (COP) and heating capacity of the system, and can also achieve the purpose of cooling down the motor.

Figure 3:
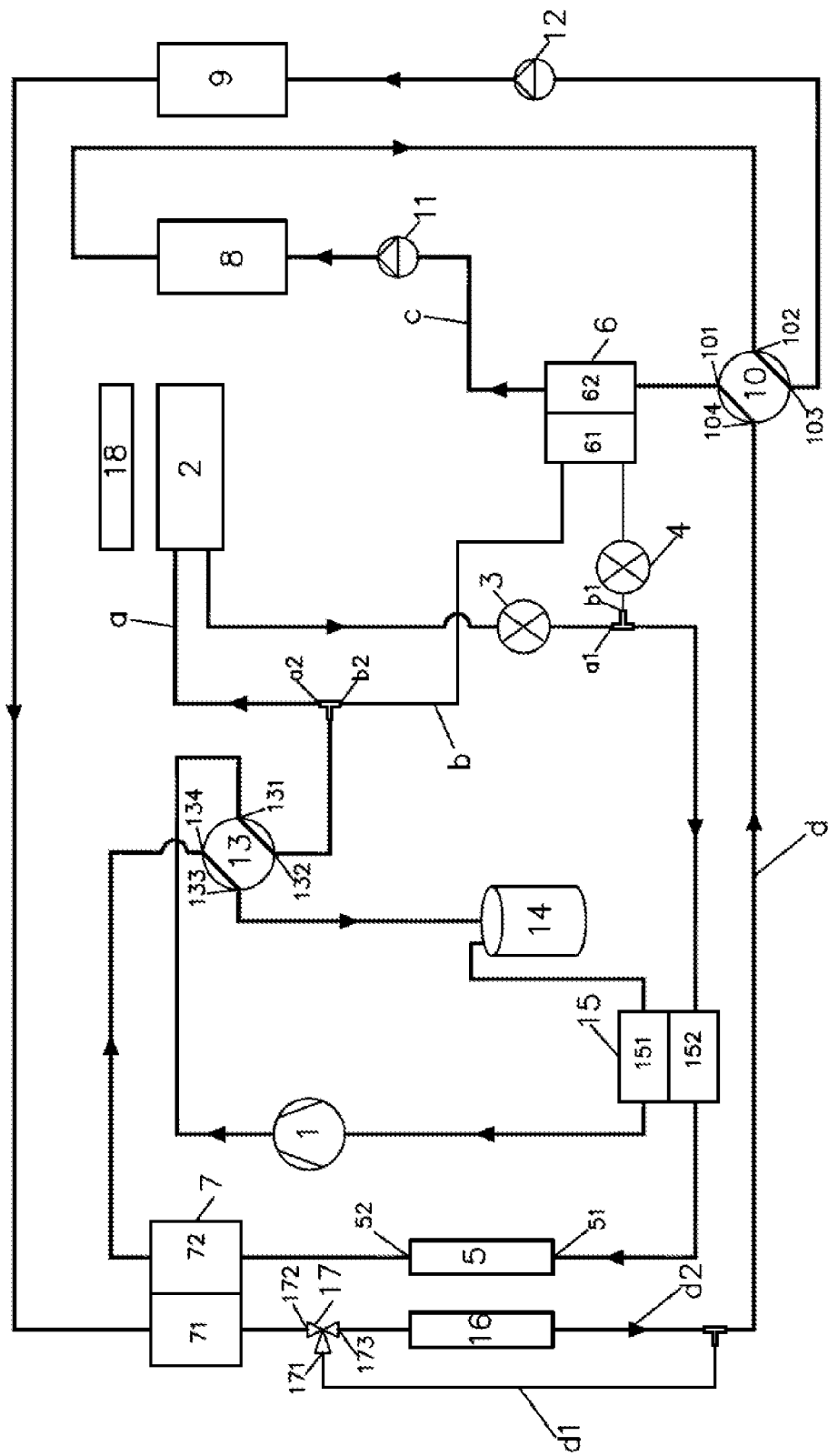
FIG. 3 is a schematic diagram of a working principle of the thermal management system in a second state of the second heating mode according to an embodiment of the present application.

Referring to FIG. 3, when the passenger compartment has a heating demand, and the battery heat exchange assembly 8 and the motor heat exchange assembly 9 have a heat dissipation demand, the thermal management system is in the second state of the second heating mode. The second port 52 of the outdoor heat exchanger 5 communicates with the inlet of the compressor 1; the second end a2 of the first branch communicates with the outlet of the compressor 1; the third fluid switching device 13 is in the first operating mode; the first flow regulating device 3 is in a throttling state; and the second flow regulating device 4 is in a cut-off state. The compressor 1, the indoor heat exchanger 2, the first flow regulating device 3, the outdoor heat exchanger 5, the first heat exchange section 72 and the gas-liquid separator 14 are communicated to form a refrigerant circuit.

At this time, the coolant system is in the second operating state, where the first flow path c and the second flow path d are communicated in series; the first fluid driving device 11 in the first flow path c and the second fluid driving device 12 in the second flow path d work together to provide power for circulating flow of the coolant; the sixth port 172 communicates with the seventh port 173 of the second fluid switching device 17; and the fourth branch d2 is connected in the coolant circuit. The first fluid driving device 11, the battery heat exchange assembly 8, the second fluid driving device 12, the motor heat exchange assembly 9, the second heat exchange section 71, the third heat exchanger 16, the first fluid switching device 10 and the fourth heat exchange section 62 are communicated to form a coolant circuit, and the refrigerant exchanges heat with the coolant through the first heat exchanger 7.

The flow state of the refrigerant in this mode is similar to the flow principle of the refrigerant in the first state of the second heating mode, which will not be described here.

In the second state of the second heating mode, the first flow path c is communicated in series with the second flow path d to form a large coolant circuit, and the third heat exchanger 16 is connected in the coolant circuit. On the one hand, some heat of the coolant is transferred to the refrigerant through the first heat exchanger 7, thereby improving the coefficient of performance (COP) and the heating capacity of the system. On the other hand, the coolant exchanges heat with the air through the third heat exchanger 16, thereby achieving the purpose of reducing the coolant temperature. The cooled coolant circulates, and thus achieves heat dissipation for the motor heat exchange assembly 9 and the battery heat exchange assembly 8.

Figure 4:
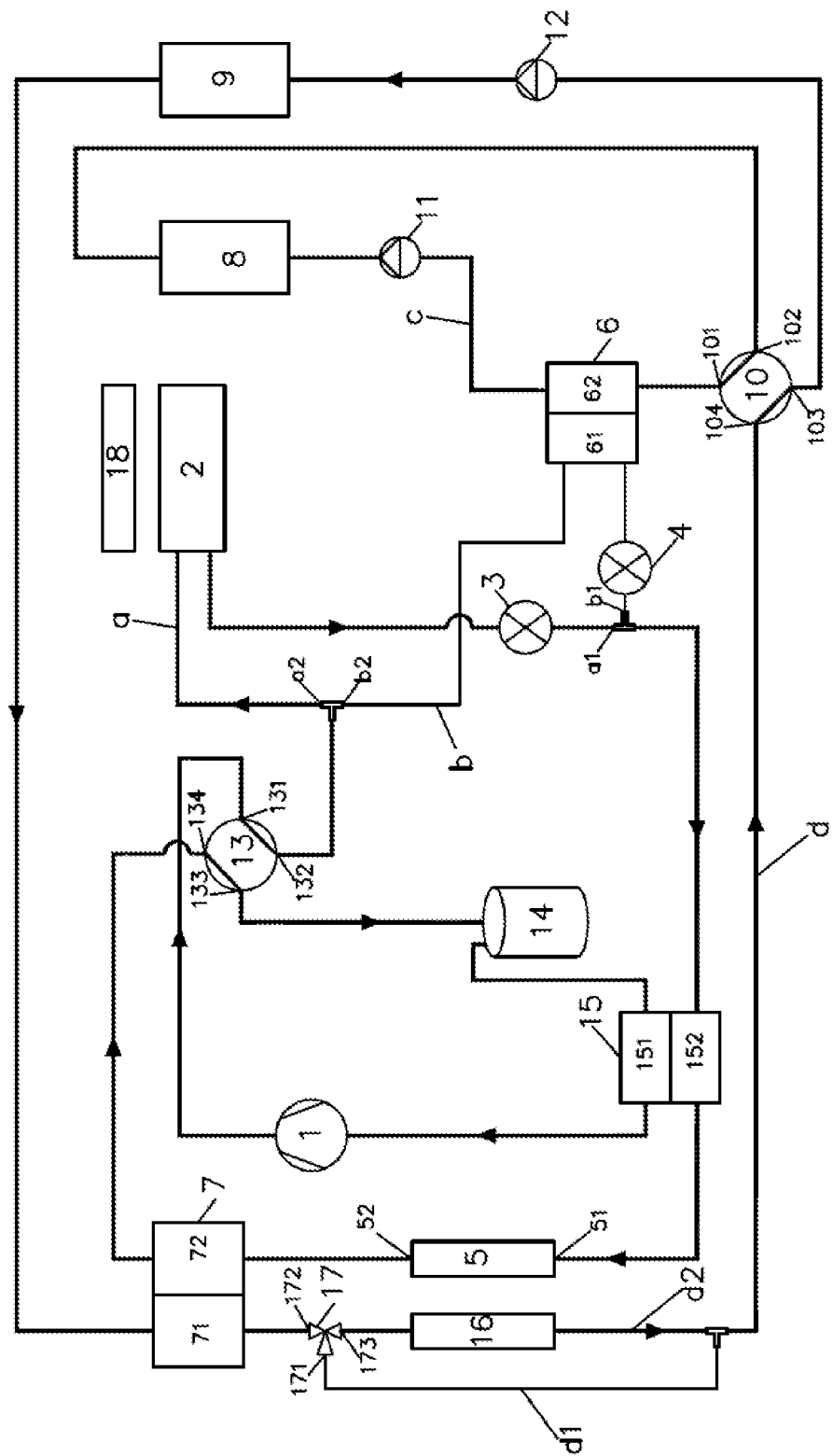
FIG. 4 is a schematic diagram of a working principle of the thermal management system in a third state of the second heating mode according to an embodiment of the present application.

Referring to FIG. 4, when the battery heat exchange assembly 8 is operating in the better operating temperature range, and the passenger compartment has a heating demand and the motor heat exchange assembly 9 has a cooling demand, the thermal management system is in the third state of the second heating mode. The second port 52 of the outdoor heat exchanger communicates with the inlet of the compressor 1; the second end a2 of the first branch communicates with the outlet of compressor 1; the third fluid switching device 13 is in the first operating mode; the first flow regulating device 3 is in the throttling state; and the second flow regulating device 4 is in the cut-off state. The compressor 1, the indoor heat exchanger 2, the first flow regulating device 3, the outdoor heat exchanger 5, the first heat exchange section 72 and the gas-liquid separator 14 are communicated to form a refrigerant circuit.

At this time, the coolant system is in the first operating state and the second flow regulating device 4 is in the cut-off state. The refrigerant in the second heat exchanger 6 does not exchange heat with the coolant; the second fluid driving device 12 in the second flow path d provides power for circulating flow of the coolant, and the sixth port 172 of the second fluid switching device 17 communicates with the seventh port 173; and the fourth branch d2 is connected in the coolant circuit. The second fluid driving device 12, the motor heat exchange assembly 9, the second heat exchange section 71, the third heat exchanger 16 and the first fluid switching device 10 are communicated to form a coolant circuit. The refrigerant exchanges heat with the coolant through the first heat exchanger 7. It can be understood that, at this time, the first fluid driving device 11 can be in operating condition, that is, the first fluid driving device 11 provides power for circulating flow of the coolant. At this time, the first fluid driving device 11, the first fluid switching device 10, the fourth heat exchange section 62 and the battery heat exchange assembly 8 are communicated to form a coolant circuit, but the coolant does not exchange heat with the refrigerant.

The flow state of the refrigerant in this mode is similar to the flow principle of the refrigerant in the first state of the second heating mode, which will not be described here.

In the third state of the second heating mode, the third heat exchanger 16 in the second flow path d is connected in the coolant circuit. On the one hand, some heat of the coolant is transferred to the refrigerant through the first heat exchanger 7, thereby improving the coefficient of performance (COP) and heating capacity of the system. On the other hand, the coolant exchanges heat with the air through the third heat exchanger 16, thereby achieving the purpose of reducing the coolant temperature. The cooled coolant circulates, and thus achieves heat dissipation for the motor heat exchange assembly 9.

Figure 6:
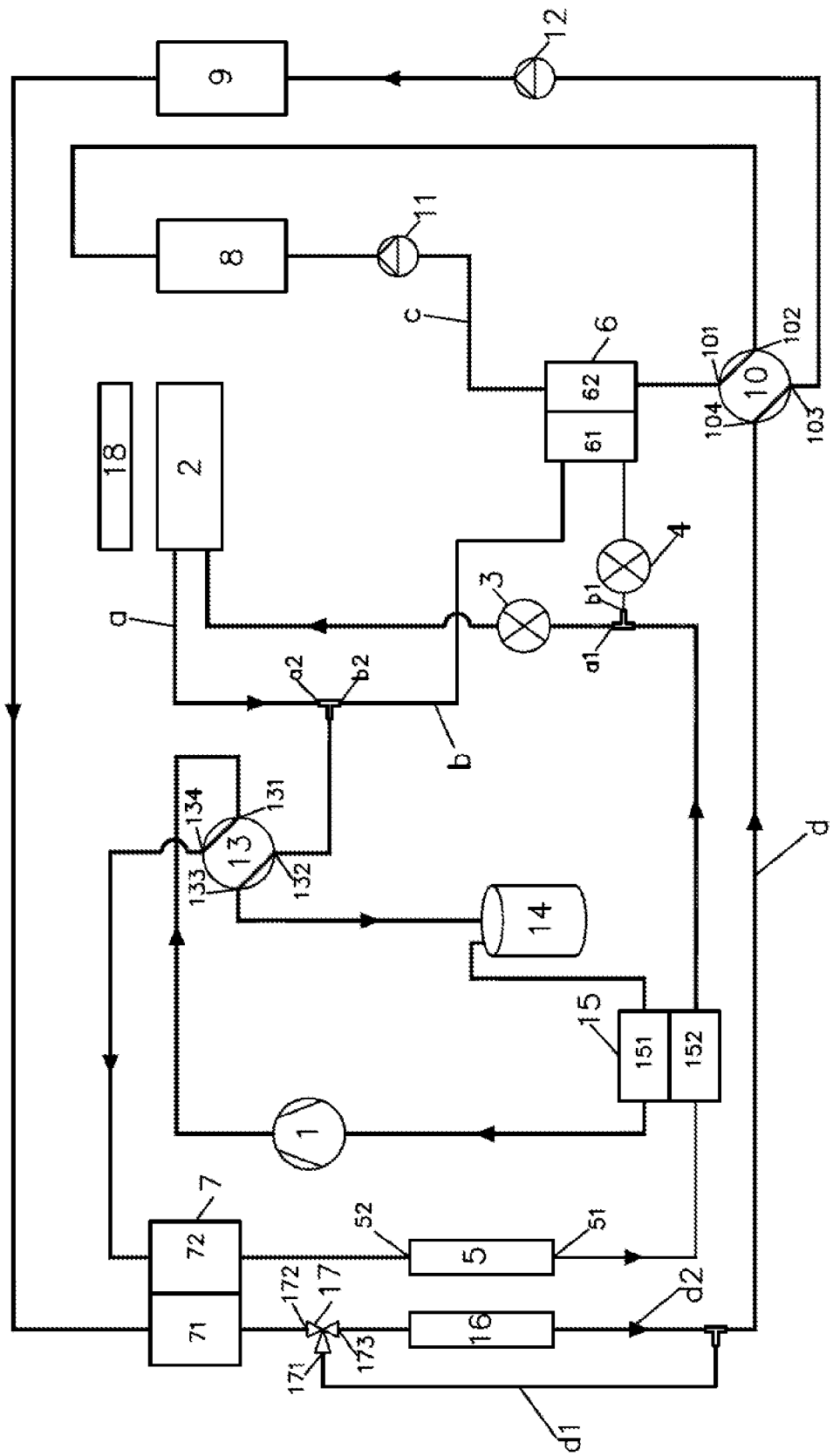
FIG. 6 is a schematic diagram of a working principle of the thermal management system in a first state of a second cooling mode according to an embodiment of the present application.
Figure 7:
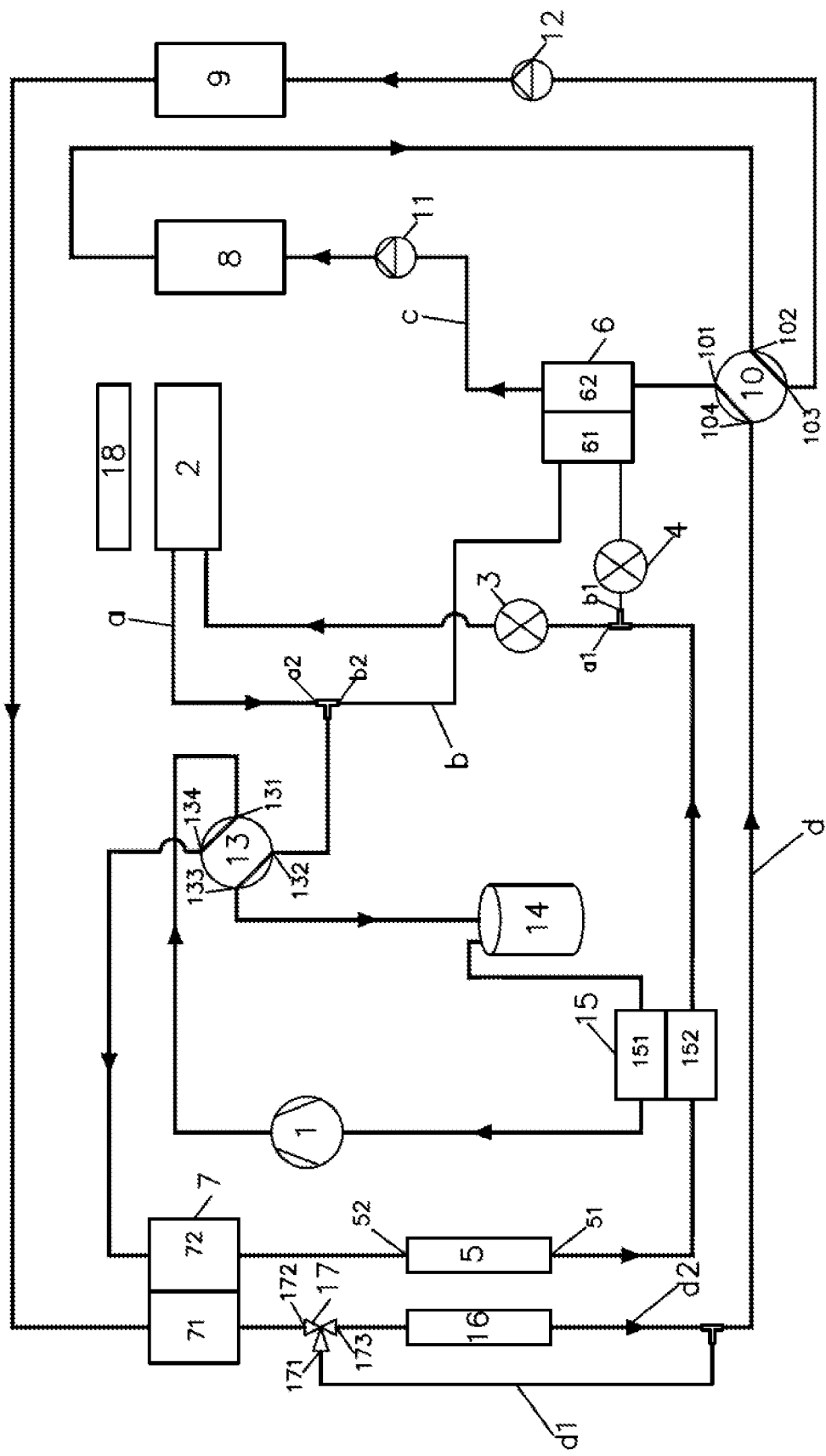
FIG. 7 is a schematic diagram of a working principle of the thermal management system in a second state of the second cooling mode according to an embodiment of the present application.

As shown in FIGS. 5 to 7, when the environment temperature is high, the passenger compartment has a cooling demand. According to the temperature of the motor heat exchange assembly 9 and the battery heat exchange assembly 8, the states of the second flow regulating device 4, the first fluid switching device 10 and the second fluid switching device 17 can be adjusted to achieve the functions of cooling the battery heat exchange assembly 8 by the refrigerant and cooling the motor heat exchange assembly 9 by the third heat exchanger 16; not exchanging heat with the refrigerant flow path of the battery heat exchange assembly 8 and cooling the motor heat exchange assembly 9; and cooling the battery heat exchange assembly 8 and motor heat exchange assembly 9 through the third heat exchanger 16, etc. The thermal management system includes a first cooling mode and a second cooling mode, according to whether the battery heat exchange assembly 8 is cooled by the refrigerant or not. The second cooling mode includes a first state of the second cooling mode and a second state of the second cooling mode, according to whether both the battery heat exchange assembly 8 and the motor heat exchange assembly 9 are cooled down by the coolant circuit.

Referring to FIG. 5, when the battery heat exchange assembly 8, the passenger compartment and the motor heat exchange assembly 9 all have cooling demands, the battery heat exchange assembly 8 and the passenger compartment can be cooled by the refrigerant, and the motor heat exchange assembly 9 can be cooled by the third heat exchanger 16. The thermal management system is in the first cooling mode; the second port 52 of the outdoor heat exchanger communicates with the outlet of the compressor 1; the second end a2 of the first branch and the second end b2 of the second branch communicate with the inlet of the compressor 1; the third fluid switching device 13 is in the second operating mode; and the first flow regulating device 3 and the second flow regulating device 4 are both in throttling mode. The compressor 1, the first heat exchanger 72, the outdoor heat exchanger 5, the first flow regulating device 3, the indoor heat exchanger 2 and the gas-liquid separator 14 are communicated to form a refrigerant circuit; and the compressor 1, the first heat exchange section 72, the outdoor heat exchanger 5, the second flow regulating device 4, the third heat exchange section 61 and the gas-liquid separator 14 are communicated to form a refrigerant circuit.

At this time, the coolant system is in the first operating state, the first flow path c and the second flow path d are communicated in parallel; the sixth port 172 of the second fluid switching device 17 communicates with the seventh port 173; and the fourth branch d2 communicates in the coolant circuit. The first fluid driving device 11, the first fluid switching device 10, the fourth heat exchange section 62 and the battery heat exchange assembly 8 are communicated to form a first coolant circuit; and the second fluid driving device 12, the motor heat exchange assembly 9, the second heat exchange section 71, the third heat exchanger 16 and the first fluid switching device 10 are communicated to form a second coolant circuit. The refrigerant exchanges heat with the coolant in the first coolant circuit through the second heat exchanger 6; and the refrigerant exchanges heat with the coolant in the second coolant circuit through the first heat exchanger 7.

The high-temperature refrigerant compressed by the compressor 1 flows into the first heat exchange section 72. The higher temperature refrigerant in the first heat exchange section 72 transfers heat to the coolant in the second heat exchange section 71, which carries away part of the heat of the refrigerant through the circulating flow of the coolant circuit. Then, the refrigerant flows into the outdoor heat exchanger 5, and the refrigerant temperature decreases further after exchanging heat with the air. The refrigerant flowing out of the outdoor heat exchanger 5 is divided into two paths, in which one path flows to the first branch a and the other path flows to the second branch b. The refrigerant enters the first branch a and flows into the indoor heat exchanger 2 after being throttled by the first flow regulating device 3. The indoor heat exchanger 2 is used as an evaporator. The refrigerant exchanges heat with the air inside the air conditioning cabinet of the passenger compartment so as to cool the passenger compartment. The refrigerant enters the second branch b and flows into the third heat exchange section 61 after being throttled by the second flow regulating device 4. The refrigerant in the third heat exchange section 61 exchanges heat with the coolant in the fourth heat exchange section 62 to lower the coolant temperature. By circulating the coolant, the purpose of cooling down the battery heat exchange assembly 8 is thereby achieved. The refrigerant in the first branch a and the second branch b converge before flowing to the gas-liquid separator 14 and then returns to the compressor 1, and the cycle is repeated in this way. The gas-liquid separator 14 is used to separate the refrigerant in the gas-liquid two-phase state into gaseous refrigerant and liquid refrigerant. The liquid refrigerant is stored in the gas-liquid separator and the gaseous refrigerant flows to the compressor 1. In some embodiments, if there is a liquid storage tank in the compressor 1, or if the refrigerant flowing into the compressor 1 is all in the gaseous state, the gas-liquid separator 14 may not be provided and the refrigerant returns directly to the compressor 1.

The thermal management system of the present application, through the action of the first heat exchanger 7 and the outdoor heat exchanger 5, reduces the temperature of the refrigerant twice before flowing to the first branch a and the second branch b, respectively, so that the refrigerant throttled by the first flow regulating device 3 and the second flow regulating device 4, respectively, has a lower temperature. Thus, the refrigerant of the first branch a can absorb more heat from the air in the indoor heat exchanger 2 so as to enhance the cooling effect. The refrigerant in the second branch b absorbs more heat from the coolant in the first coolant circuit, thereby improving the battery cooling effect. In this mode, battery cooling can be achieved by refrigerant, and a better cooling effect can be achieved. On the other hand, the coolant in the second coolant circuit exchanges heat with the air through the third heat exchanger 16 to achieve the purpose of lowering the coolant temperature. The cooled coolant circulates, and thus achieves the purpose of cooling the motor heat exchange assembly 9.

Referring to FIG. 6, when the temperature of the battery heat exchange assembly 8 is appropriate and there is a cooling demand for both the passenger compartment and the motor heat exchange assembly 9, the motor heat exchange assembly 9 is cooled down by the third heat exchanger 16. The thermal management system is in the first state of the second cooling mode; the second port 52 of the outdoor heat exchanger 5 communicates with the outlet of the compressor 1; the second end a2 of the first branch communicates with the inlet of compressor 1; the third fluid switching device 13 is in the second operating mode; the first flow regulating device 3 is in the throttling state; and the second flow regulating device 4 is in the cut-off state. The compressor 1, the first heat exchange section 72, the outdoor heat exchanger 5, the first flow regulating device 3, the indoor heat exchanger 2 and the gas-liquid separator 14 are communicated to form a refrigerant circuit.

At this time, the coolant system is in the first operating state and the second flow regulating device 4 is in the cut-off state. The refrigerant in the second heat exchanger 6 does not exchange heat with the coolant; the second fluid driving device 12 in the second flow path d provides power for circulating flow of the coolant, and the sixth port 172 of the second fluid switching device 17 communicates with the seventh port 173; the fourth branch d2 is connected in the coolant circuit. The second fluid driving device 12, the motor heat exchange assembly 9, the second heat exchange section 71, the third heat exchanger 16 and the first fluid switching device 10 are communicated to form a coolant circuit. The refrigerant exchanges heat with the coolant through the first heat exchanger 7. It can be understood that, at this time, the first fluid driving device 11 can be in operating condition, that is, the first fluid driving device 11 to provide power for circulating flow of the coolant. At this time, the first fluid driving device 11, the first fluid switching device 10, the fourth heat exchange section 62 and the battery heat exchange assembly 8 are communicated to form a coolant circuit, but the coolant does not exchange heat with the refrigerant.

The high-temperature refrigerant compressed by the compressor 1 flows into the first heat exchange section 72. The higher temperature refrigerant in the first heat exchange section 72 transfers heat to the coolant in the second heat exchange section 71, which carries away some of the heat of the refrigerant by circulating flow of the coolant circuit. Then, the refrigerant flows into the outdoor heat exchanger 5, and the temperature of the refrigerant decreases further after exchanging heat with the air. The refrigerant flowing out of the outdoor heat exchanger 5 flows to the first branch a. The refrigerant enters the first branch a and flows into the indoor heat exchanger 2 after being throttled by the first flow regulating device 3. The indoor heat exchanger 2 is used as an evaporator. The refrigerant exchanges heat with the air in the passenger compartment to cool the passenger compartment. The refrigerant flowing out of the first branch a flows to the gas-liquid separator 14 and then returns to the compressor 1, and the cycle is repeated in this way. The gas-liquid separator 14 is used to separate the refrigerant in the gas-liquid two-phase state into gaseous refrigerant and liquid refrigerant. The liquid refrigerant is stored in the gas-liquid separator, and the gaseous refrigerant flows into the compressor 1. In some embodiments, if there is a liquid storage tank in the compressor 1, or if the refrigerant flowing into the compressor 1 is all in the gaseous state, the gas-liquid separator 14 may not be provided and the refrigerant returns directly to the compressor 1.

The thermal management system is in the first state of the second cooling mode, and exchanges heat with the air through the third heat exchanger 16 to reduce the temperature of the coolant. Through the circulating flow of the coolant, the purpose of cooling the motor heat exchange assembly 9 can be achieved, and the purpose of lowering the temperature of the refrigerant before entering the first branch a can be achieved through the first heat exchanger 7. It is possible to achieve cooling of the motor heat exchange assembly 9 while improving the cooling effect of the thermal management system.

Referring to FIG. 7, when the battery heat exchange assembly 8, the passenger compartment and the motor heat exchange assembly 9 all have cooling demands, the battery heat exchange assembly 8 and the motor heat exchange assembly 9 can be cooled down by the third heat exchanger 16. The thermal management system is in the second state of the second cooling mode; the second port 52 of the outdoor heat exchanger communicates with the outlet of the compressor 1; the second end a2 of the first branch communicates with the inlet of compressor 1; the third fluid switching device 13 is in the second operating mode; the first flow regulating device 3 is in the throttling state; and the second flow regulating device 4 is in the cut-off state. The compressor 1, the first heat exchange section 72, the outdoor heat exchanger 5, the first flow regulating device 3, the indoor heat exchanger 2 and the gas-liquid separator 14 are communicated to form a refrigerant circuit.

At this time, the coolant system is in the second operating state, where the first flow path c and the second flow path d are communicated in series; the first fluid driving device 11 in the first flow path c and the second fluid driving device 12 in the second flow path d work together to provide power for circulating flow of the coolant; the sixth port 172 communicates with the seventh port 173 of the second fluid switching device 17; and the fourth branch d2 is connected in the coolant circuit. The first fluid driving device 11, the battery heat exchange assembly 8, the second fluid driving device 12, the motor heat exchange assembly 9, the second heat exchange section 71, the third heat exchanger 16, the first fluid switching device 10 and the fourth heat exchange section 62 are communicated to form a coolant circuit, and the refrigerant exchanges heat with the coolant through the first heat exchanger 7.

The flow state of the refrigerant in this mode is similar to the flow principle of the refrigerant in the first state of the second refrigeration mode, which will not be described here.

In the second state of the second cooling mode, the temperature of the coolant is reduced by heat exchange with the air through the third heat exchanger 16. By circulating the flow of coolant, the purpose of cooling both the motor heat exchange assembly 9 and the battery heat exchange assembly 8 can be achieved, and the purpose of lowering the temperature of the refrigerant before entering the first branch a can be achieved through the first heat exchanger 7. It is possible to achieve cooling of the motor heat exchange assembly 9 and the battery heat exchange assembly 8 while improving the cooling effect of the thermal management system.

The first flow regulating device 3 and the second flow regulating device 4 of this embodiment are both bi-directional throttle valves, which reduces the number of valve members and connection pipelines of the thermal management system, and makes the structure of the thermal management system simpler. The first flow regulating device 3 and the second flow regulating device 4 are at an upstream end or a downstream end of their respective branches at the same time when the thermal management system is in operation. When the passenger compartment is heated, the battery heat exchange assembly 8 can be heated. When the passenger compartment is cooled, the battery heat exchange assembly 8 can be cooled. The heating or cooling of the battery heat exchange assembly 8 can be achieved by the refrigerant, which saves the high pressure water-cooled PTC electric heater in the coolant circuit, reduces cost and improves safety. The first heat exchanger 7 is provided between the outdoor heat exchanger 5 and the compressor 1. When the passenger compartment is heated, the heat of the coolant circuit can be recycled to improve the heating effect of the system. When the passenger compartment is cooled, the temperature of the coolant before throttling can be reduced twice to improve the cooling effect of the system.

Figure 8:
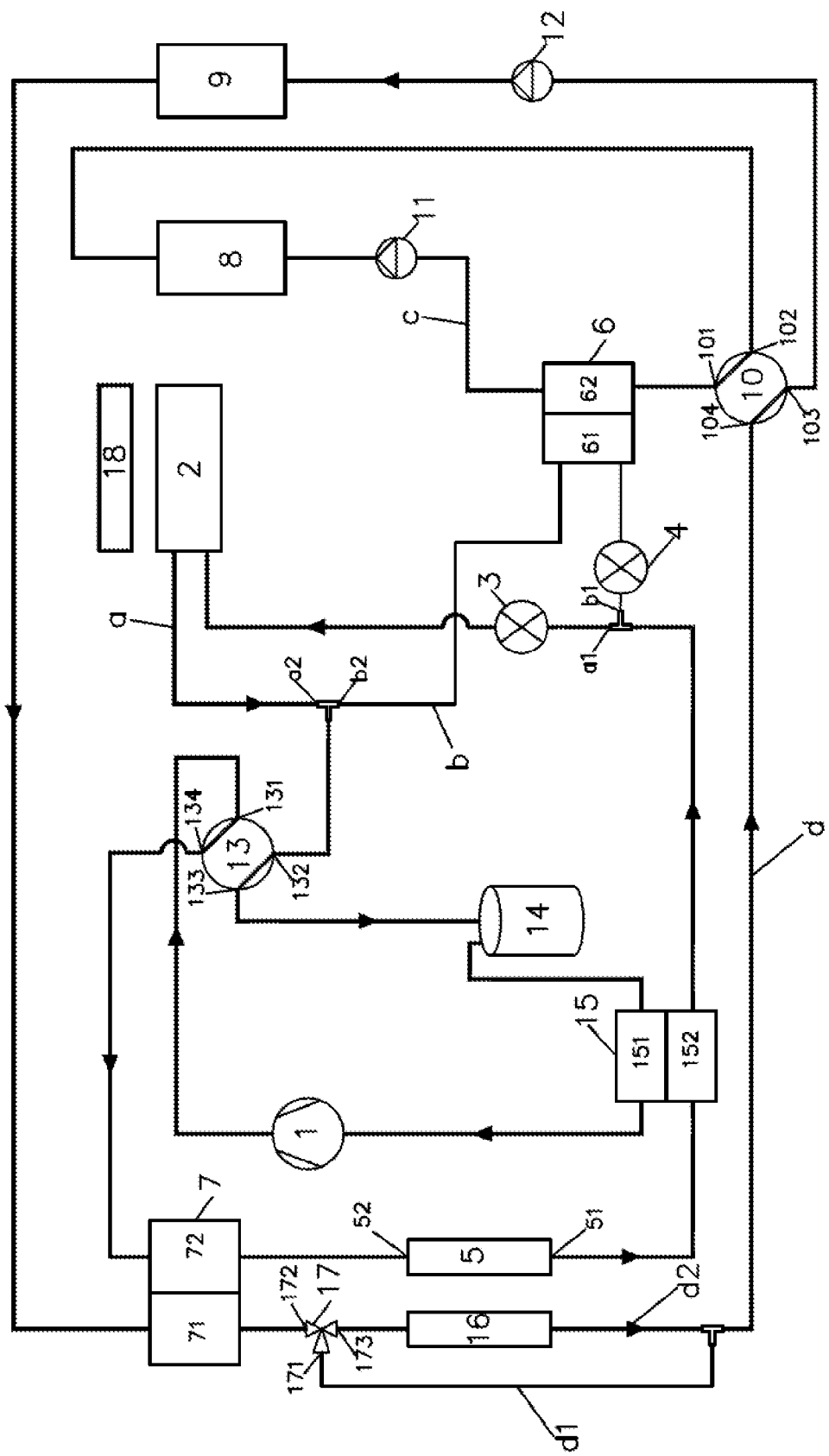
FIG. 8 is a schematic diagram of a working principle of the thermal management system in a heating and dehumidifying mode according to an embodiment of the present application.

When the environment temperature is low in winter and the temperature inside the passenger compartment is high, the difference between the temperature inside the passenger compartment and the environment temperature outside the vehicle is large. Water mist or water droplets will condense on the vehicle window, which will affect the line of sight and pose a safety hazard when driving. The thermal management system of this embodiment has a heating and dehumidifying mode. Referring to FIG. 8, the second port 52 of the outdoor heat exchanger communicates with the outlet of the compressor 1; the second end a2 of the first branch communicates with the inlet of compressor 1; the third fluid switching device 13 is in the second operating mode; and the first flow regulating device 3 is in throttling mode. The compressor 1, the first heat exchange section 72, the outdoor heat exchanger 5, the first flow regulating device 3, the indoor heat exchanger 2 and the gas-liquid separator 14 are communicated to form a refrigerant circuit. At this time, the heating device 18 is turned on. Optionally, the heating device 18 is an air-cooled PTC electric heater.

The flow state of the coolant circuit and the state of the second flow regulating device 4 in this mode are adjusted according to the states of the motor heat exchange assembly 9 and the battery heat exchange assembly 8. The specific adjustment can be referred to the above heating mode and cooling mode, which will not be repeated here.

The high-temperature refrigerant compressed by the compressor 1 flows into the first heat exchange section 72. The higher temperature refrigerant in the first heat exchange section 72 transfers heat to the coolant in the second heat exchange section 71, which carries away some of the heat of the refrigerant by circulating flow of the coolant circuit. Then, the refrigerant flows into the outdoor heat exchanger 5, and the temperature of the refrigerant decreases further after exchanging heat with the air. The refrigerant flowing out of the outdoor heat exchanger 5 flows to the first branch a. The refrigerant enters the first branch a and flows into the indoor heat exchanger 2 after being throttled by the first flow regulating device 3. The indoor heat exchanger 2 is used as an evaporator. The refrigerant exchanges heat with the air in the passenger compartment. Since the temperature of indoor heat exchanger 2 is relatively low and the air temperature inside the air conditioning cabinet of the passenger compartment is high, the moisture in the air inside the air conditioning cabinet of the passenger compartment condenses into water droplets in the air conditioning cabinet and then is discharged, thereby reducing the humidity of the air entering the passenger compartment. The heating device 18 is located on a downstream side of the air flow relative to the indoor heat exchanger 2. The air flowing through the indoor heat exchanger 2 then exchanges heat with the heating device 18, thereby heating the air entering the passenger compartment, and heating the passenger compartment. The refrigerant flowing out of the first branch a flows to the gas-liquid separator 14. The refrigerant flowing out of the gas-liquid separator 14 flows to the compressor 1, and the cycle is repeated in this way. The gas-liquid separator 14 is used to separate the refrigerant in the gas-liquid two-phase state into gaseous refrigerant and liquid refrigerant. The gaseous refrigerant flows into the compressor 1. In some embodiments, if there is a liquid storage tank in the compressor 1, or if the refrigerant flowing into the compressor 1 is all in the gaseous state, the gas-liquid separator 14 may not be provided and the refrigerant returns directly to the compressor 1. In this mode, the humidity of the air in the passenger compartment is reduced by the indoor heat exchanger 2, and the temperature of the air entering the passenger compartment is heated by the heating device 18 to achieve the heating and dehumidification function.

Figure 9:
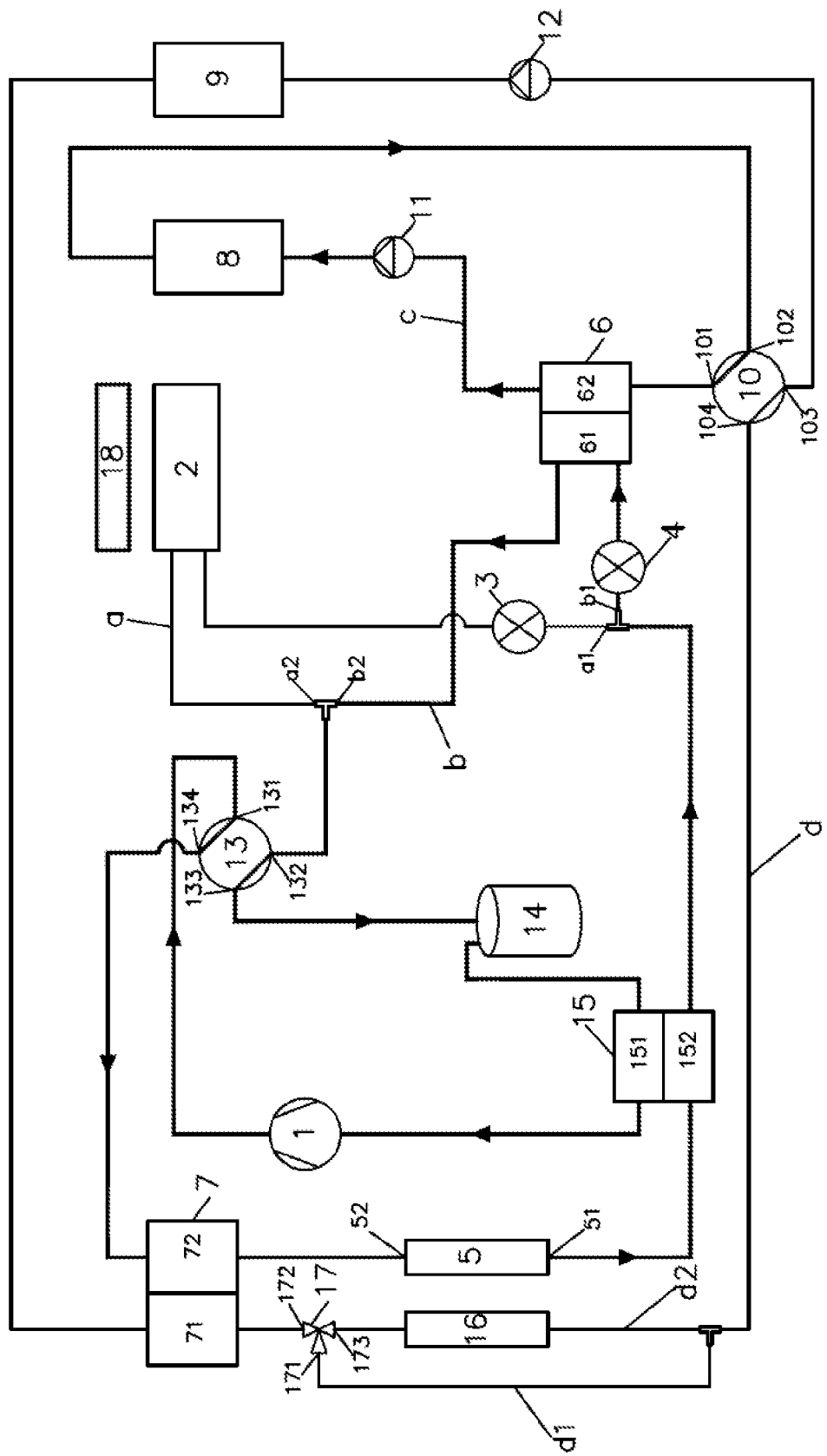
FIG. 9 is a schematic diagram of a working principle of the thermal management system in a first defrosting mode according to an embodiment of the present application.
Figure 10:
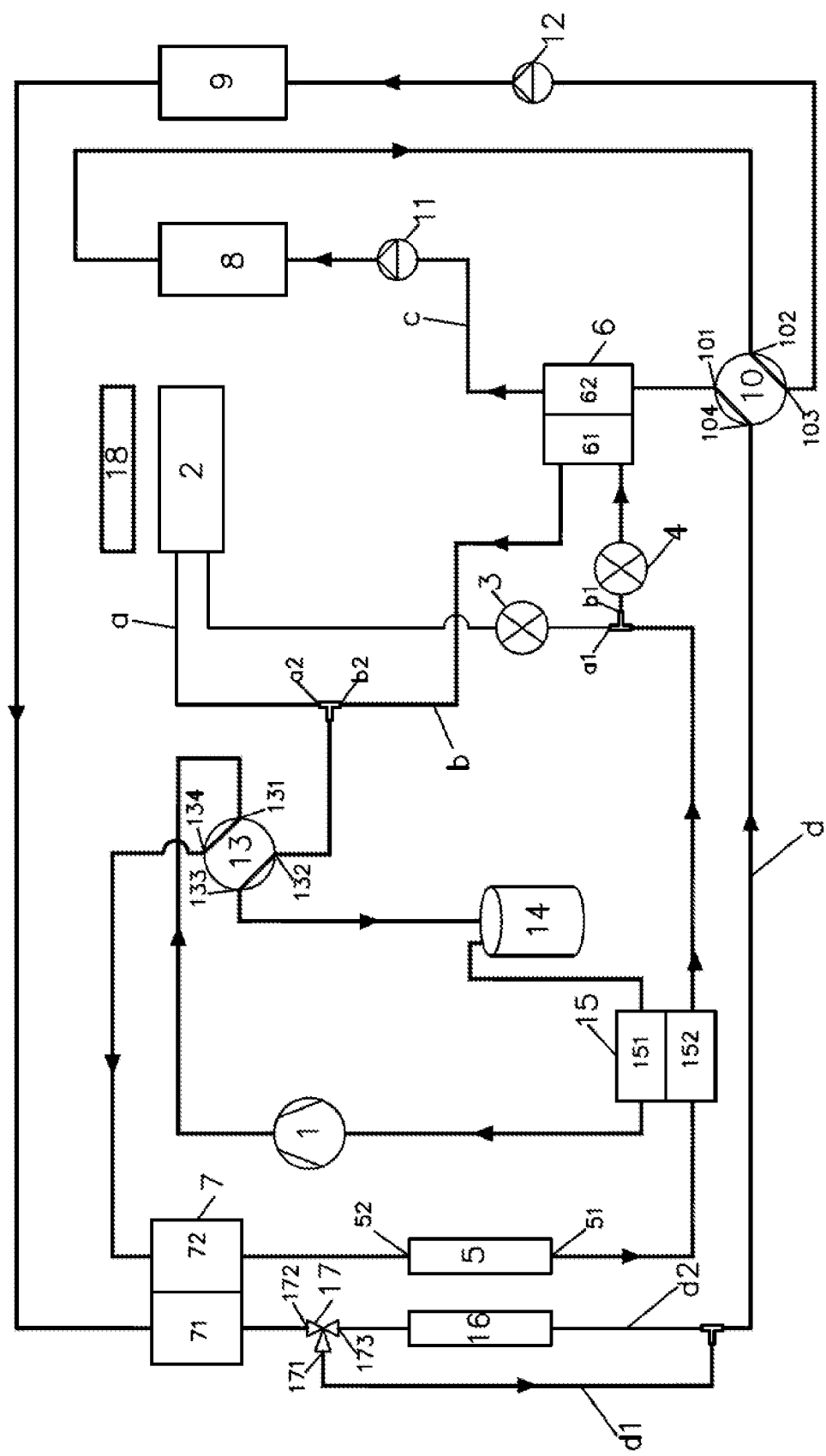
FIG. 10 is a schematic diagram of a working principle of the thermal management system in a second defrosting mode according to an embodiment of the present application.

When the passenger compartment has heating demand, after the thermal management system is in operation in the first heating mode, the first state of the second heating mode, the second state of the second heating mode or the third state of the second heating mode for a period of time, the outdoor heat exchanger 5 will have the possibility of frosting due to the low outdoor environment temperature and the outdoor heat exchanger 5 is used as an evaporator. After the outdoor heat exchanger 5 is frosted, the heat transfer performance of the outdoor heat exchanger 5 is reduced, which affects the normal operation of the thermal management system and has an impact on the comfort of the passenger compartment. As shown in FIGS. 9 and 10, the thermal management system of the present embodiment has a first defrosting mode and a second defrosting mode, depending on the state of the thermal management system.

Referring to FIG. 9, the thermal management system is in the first defrosting mode when the motor heat exchange assembly 9 is at a moderate temperature and the battery heat exchange assembly 8 has residual heat. The second port 52 of the outdoor heat exchanger communicates with the outlet of the compressor 1; the second end b2 of the second branch communicates with the inlet of compressor 1; the third fluid switching device 13 is in the second operating mode; the first flow regulating device 3 is in the cut-off state; and the second flow regulating device 4 is in the throttling state. The compressor 1, the first heat exchanger 72, the outdoor heat exchanger 5, the second flow regulating device 4, the third heat exchanger 61 and the gas-liquid separator 14 are communicated to form a refrigerant circuit. The heating device 18 is in the heating state to heat the air entering the passenger compartment.

At this time, the coolant system is in the first operating state, where the first fluid driving device 11 in the first flow path c provides power for circulating flow of the coolant; the second fluid driving device 12 in the second flow path d is not operating, the fifth port 171 of the second fluid switching device 17 communicates with the sixth port 172; and the third branch d1 is connected in the coolant circuit. The first fluid driving device 11, the first fluid switching device 10, the fourth heat exchange section 62 and the battery heat exchange assembly 8 are communicated to form a coolant circuit. The refrigerant exchanges heat with the coolant through the second heat exchanger 6. Because the coolant in the second flow path d lacks of driving power, and the third port 103 and the fourth port 104 of the first fluid switching device 10 are not communicated, at this time, the refrigerant transfers heat to the coolant in the second flow path d through the first heat exchanger 7. The coolant in the second flow path d is used as a heat storage, which prevents the temperature of the refrigerant entering the outdoor heat exchanger 5 from being lowered and improves the performance of defrosting.

In this mode, the outdoor heat exchanger 5 is used as a condenser and the second heat exchanger 6 is used as an evaporator. The high-temperature refrigerant compressed by the compressor 1 flows through the first heat exchange section 72 and then flows into the outdoor heat exchanger 5. The high-temperature refrigerant decreases in temperature after exchanging heat with the air and the frost layer. The frost layer in the outdoor heat exchanger 5 is heated and then melted to achieve defrosting. The refrigerant flowing out of the outdoor heat exchanger 5 flows to the second branch b. The refrigerant enters the second branch b and flows to the third heat exchanger 61 after being throttled by the second flow regulating device 4. The cooler refrigerant in the third heat exchange section 61 exchanges heat with the coolant in the fourth heat exchange section 62, and transfers heat from the battery heat exchange assembly 8 to the refrigerant through the circulating flow of the coolant circuit. At this time, the heating device 18 is in operation to heat the air entering the passenger compartment and achieve heating of the passenger compartment. The refrigerant flowing out of the second branch b flows to the gas-liquid separator 14. The gas-liquid separator 14 is used to separate the refrigerant in the gas-liquid two-phase state into gas refrigerant and liquid refrigerant. The liquid refrigerant is stored in the gas-liquid separator 14, and the gaseous refrigerant flows into the compressor 1, and the cycle is repeated in this way. In some embodiments, if there is a liquid storage tank in the compressor 1, or if the refrigerant flowing into the compressor 1 is all in the gaseous state, the gas-liquid separator 14 may not be provided and the refrigerant returns directly to the compressor 1. The outdoor heat exchanger 5 is used as a condenser, the second heat exchanger 6 is used as an evaporator and the heating function of the heating device 18 is turned on. Utilizing the residual heat of the battery heat exchange assembly 8, while realizing the defrosting of the outdoor heat exchanger 5, the temperature of the passenger compartment is kept stable, and the comfort is improved.

Referring to FIG. 10, the thermal management system is in the second defrosting mode when the motor heat exchange assembly 9 has more residual heat and the battery heat exchange assembly 8 temperature has no residual heat, or when the thermal management system is in the first defrosting mode operating for a period of time after the temperature of the battery heat exchange assembly 8 has decreased and the temperature of the motor heat exchange assembly 9 has increased. The second port 52 of the outdoor heat exchanger communicates with the outlet of the compressor 1; the second end b2 of the second branch communicates with the inlet of compressor 1; the third fluid switching device 13 is in the second operating mode; the first flow regulating device 3 is in the cut-off state; and the second flow regulating device 4 is in the throttling state. The compressor 1, the first heat exchanger 72, the outdoor heat exchanger 5, the second flow regulating device 4, the third heat exchanger 61 and the gas-liquid separator 14 are communicated to form a refrigerant circuit. The heating device 18 is in the heating state and heats the air entering the passenger compartment.

At this time, the coolant system is in the second operating state, where the first flow path c and the second flow path d are communicated in series; the first fluid driving device 11 and the second fluid driving device 12 simultaneously provide power for circulating flow of the coolant; the fifth port 171 of the second fluid switching device 17 communicates with the sixth port 172; and the third branch d1 is connected in the coolant circuit. The first fluid driving device 11, the battery heat exchange assembly 8, the second fluid driving device 12, the motor heat exchange assembly 9, the second heat exchange section 71, the third branch d1, the first fluid switching device 10 and the fourth heat exchange section 62 are communicated to form a coolant circuit. The refrigerant exchange heat with the coolant through the second heat exchanger 6, and the refrigerant exchanges heat with the coolant through the first heat exchanger 7.

In this mode, the outdoor heat exchanger 5 is used as a condenser and the second heat exchanger 6 is used as an evaporator. The flow state of the refrigerant in this mode is approximately the same as the flow state of the refrigerant in the first defrosting mode, and the same points are not repeated here.

Since the battery heat exchange assembly 8 has no residual heat, if it is operated according to the first defrosting mode, it may cause the temperature of the battery heat exchange assembly 8 to be too low, thus affecting the normal operation of the battery heat exchange assembly 8. At this time, the motor has residual heat, and the first flow path c is communicated in series with the second flow path d. Through the circulating flow of coolant, the residual heat of the motor is used to provide a source of heat for the second heat exchanger 6, and the operating temperature of the battery heat exchange assembly 8 can be ensured. Since the motor heat exchange assembly 9 has residual heat and the coolant temperature is also relatively high, there is less heat exchange in the first heat exchanger 7, which has less effect on the defrosting effect of the outdoor heat exchanger 5. On the other hand, part of the heat of the refrigerant can be transferred to the coolant through the first heat exchanger 7, and used at the second heat exchanger 6 through the circulating flow of the coolant.

In some other embodiments, some valves and pipelines can be provided so that the coolant in the second flow path d does not flow through the second heat exchange part 71, thereby reducing the influence of the first heat exchanger 7 on the defrosting effect.

Figure 11:
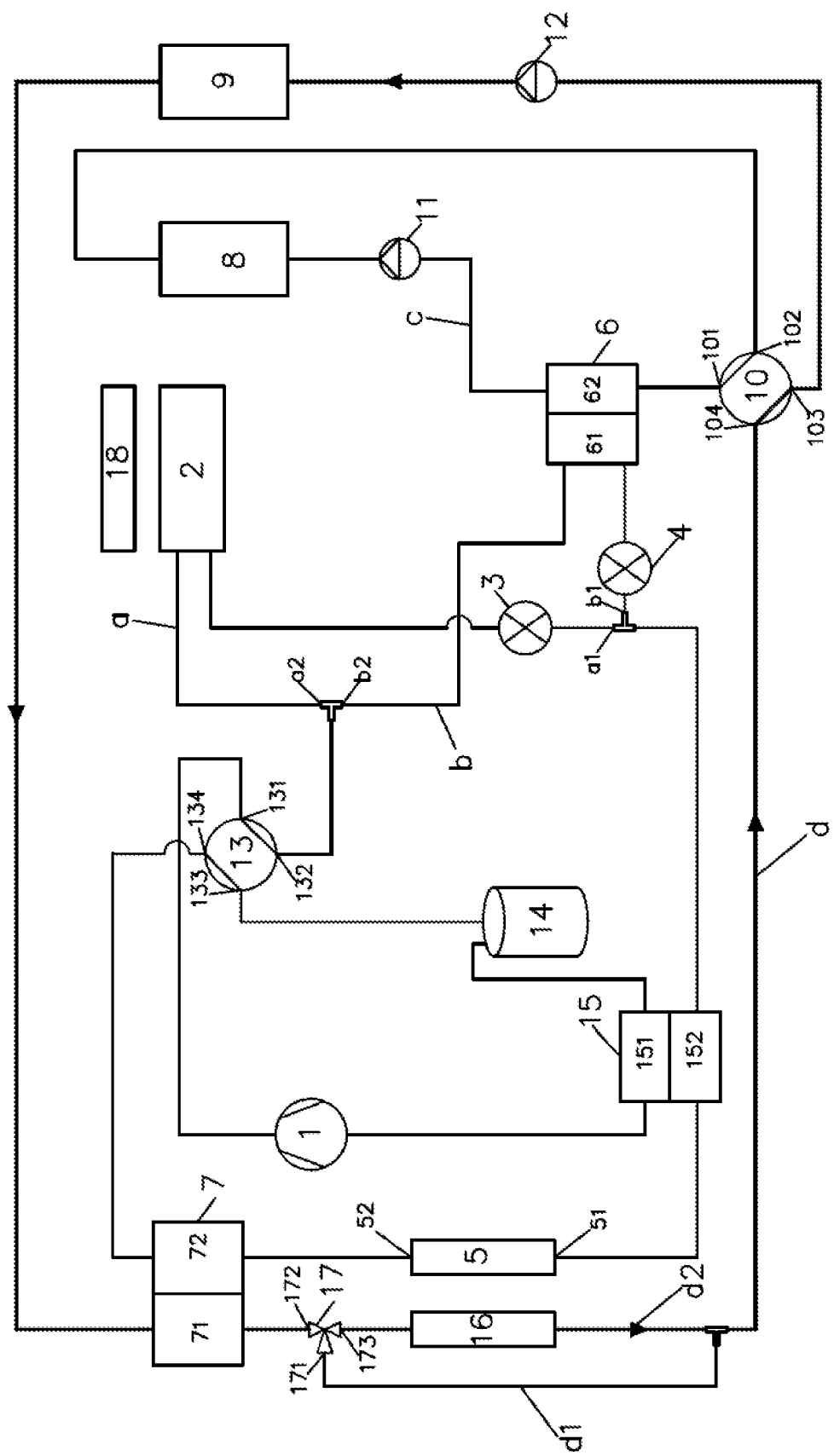
FIG. 11 is a schematic diagram of a working principle of the thermal management system in a first heat dissipation mode according to an embodiment of the present application.
Figure 12:
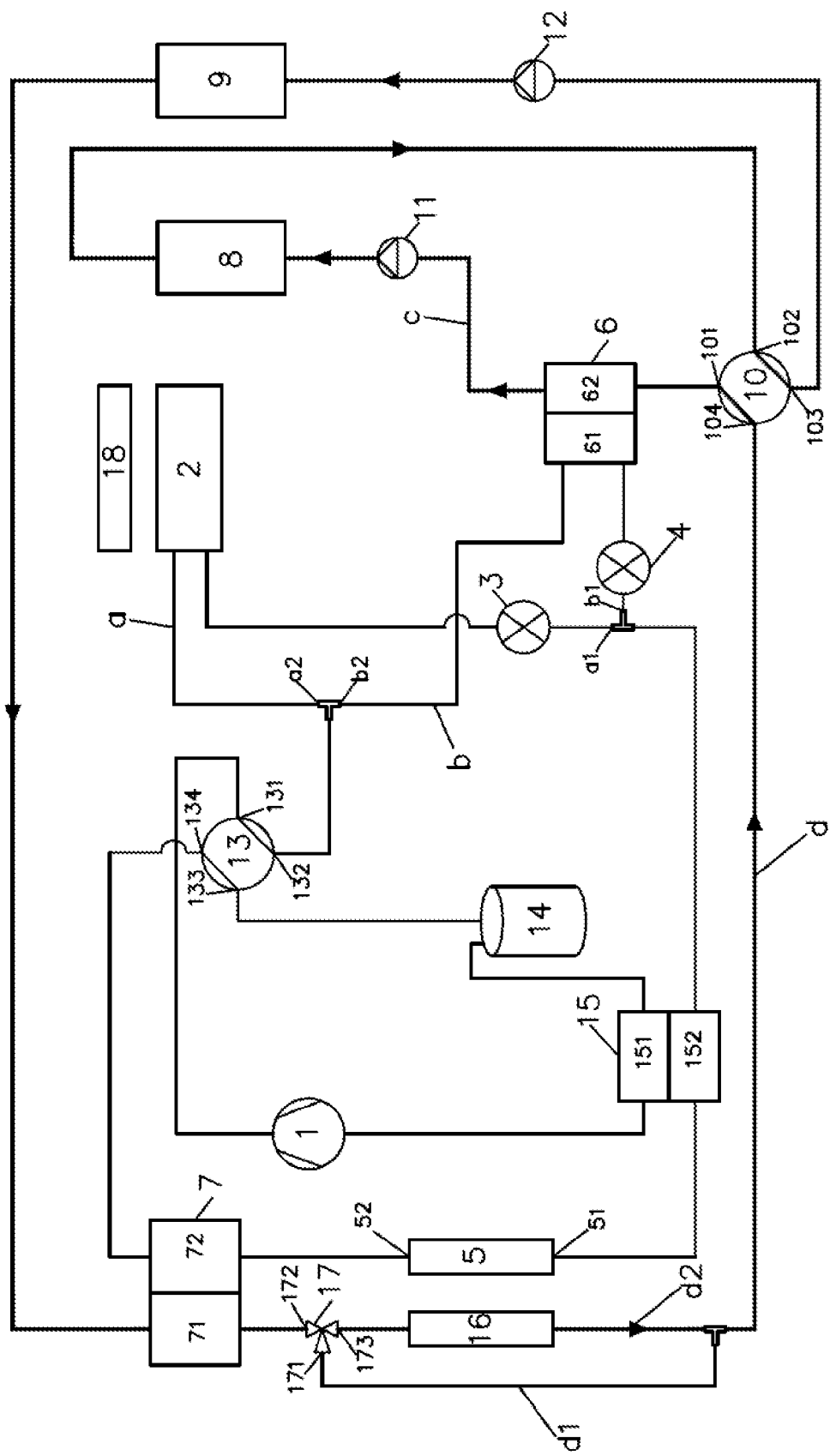
FIG. 12 is a schematic diagram of a working principle of the thermal management system in a second heat dissipation mode according to an embodiment of the present application.

As shown in FIGS. 11 and 12, the thermal management system of the present embodiment has a first heat dissipation mode and a second heat dissipation mode when there is no heating or cooling demand in the passenger compartment, depending on the state of the motor heat exchange assembly 9 and the battery heat exchange assembly 8.

Referring to FIG. 11, the passenger compartment has no heating or cooling demand, the compressor 1 is an off state, and the thermal management system is in the first heat dissipation mode when only the motor heat exchange assembly 9 has a cooling demand. The coolant system is in the first operating state; the sixth port 172 of the second fluid switching device 17 communicates with the seventh port 173; the fourth branch d2 is connected in the coolant circuit; the second fluid driving device 12, the motor heat exchange assembly 9, the second heat exchange section 71 and the third heat exchanger 16 are communicated to form a coolant circuit. The third heat exchanger 16 exchanges heat with the air to reduce the temperature of the coolant, and the coolant circulates to achieve the purpose of cooling the motor heat exchange assembly 9.

Referring to FIG. 12, the passenger compartment has no heating or cooling demand, and the compressor 1 is in the off state. When both the motor heat exchange assembly 9 and the battery heat exchange assembly 8 have cooling demands, the thermal management system is in the second heat dissipation mode. The coolant system is in the second operating state; the sixth port 172 of the second fluid switching device 17 communicates with the seventh port 173; the fourth branch d2 is connected in the coolant circuit; and the first fluid driving device 11, the battery heat exchange assembly 8, the second fluid driving device 12, the motor heat exchange assembly 9, the second heat exchange section 71, the third heat exchanger 16, the first fluid driving device 11 and the fourth heat exchange section 62 are communicated to form a coolant circuit. The third heat exchanger 16 exchanges heat with the air to reduce the temperature of the coolant, and the coolant circulates to achieve the purpose of cooling the motor heat exchange assembly 9 and the battery heat exchange assembly 8.

In some other embodiments, the thermal management system further includes a fourth heat exchanger 15. The fourth heat exchanger 15 includes a fifth heat exchange section 151 and a sixth heat exchange section 152. Both the fifth heat exchange section 151 and the sixth heat exchange section 152 flow with the refrigerant from the same refrigerant system. The fourth heat exchanger 15 and the gas-liquid separator 14 are integrated into one unit to form a gas-liquid separation device, or can be provided separately and assembled close to each other to form a gas-liquid separation device. In the case where the fourth heat exchanger 15 and the gas-liquid separator 14 are provided separately, the fifth heat exchange section 151 is connected between the inlet of the compressor 1 and the outlet of the gas-liquid separator 14; the sixth heat exchange section 152 is connected between the first port 51 of the outdoor heat exchanger and the first end a1 of the first branch; and the sixth heat exchange section 152 is connected between the first port 51 of the outdoor heat exchanger and the first end b1 of the second branch.

When the third fluid switching device 13 is in the first operating mode, the inlet of the gas-liquid separator 14 is connected to the second port 52 of the outdoor heat exchanger. When the third fluid switching device 13 is in the second operating mode, the inlet of the gas-liquid separator 14 is connected to the second end a2 of the first branch and the second end b2 of the second branch.

When the third fluid switching device 13 is in the second operating mode, the refrigerant with higher temperature in the sixth heat exchange section 152 exchanges heat with the refrigerant with lower temperature in the fifth heat exchange section 151, which can reduce the temperature of the refrigerant before entering the first branch a and the second branch b, i.e., the temperature of the refrigerant before throttling, and improve the cooling effect of the system. It is also possible to heat the refrigerant flowing out of the gas-liquid separator 14, thereby reducing the possibility of liquid refrigerant entering the compressor 1 and reducing the risk of liquid strike of the compressor 1.

When the third fluid switching device 13 is in the first operating mode, the refrigerant in the sixth heat exchange section 152 does not differ much from the refrigerant in the fifth heat exchange section 151 in temperature, and there is less heat exchange and less impact of the thermal management system.

In some other embodiments, the fourth heat exchanger 15 and the gas-liquid separator 14 may also be designed as a single unit. Specifically, the fourth heat exchanger 15 is at least partially disposed inside the gas-liquid separator 14; the fifth heat exchange section 151 is part of the gas-liquid separator 14; and the outlet of the gas-liquid separator 14 is connected to the inlet of the compressor 1. The sixth heat exchange section 152 performs heat exchange with the fifth heat exchange section 151, and the sixth heat exchange section 152 is fixedly connected to the gas-liquid separator 14.

Figure 13:
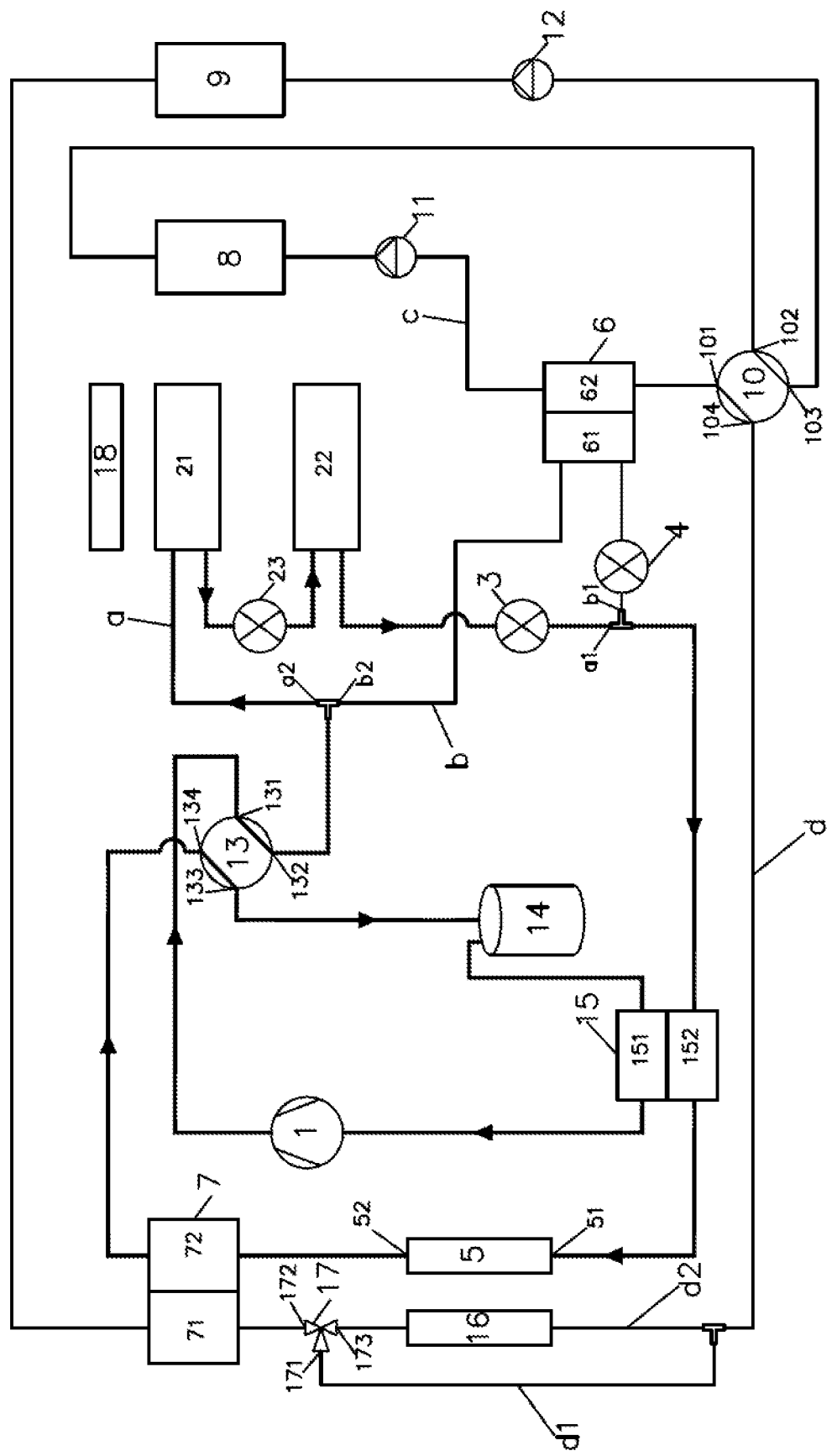
FIG. 13 is a schematic diagram of an exemplary working principle of the thermal management system according to another embodiment of the present application, wherein a third fluid switching device is in a first operating mode.
Figure 14:
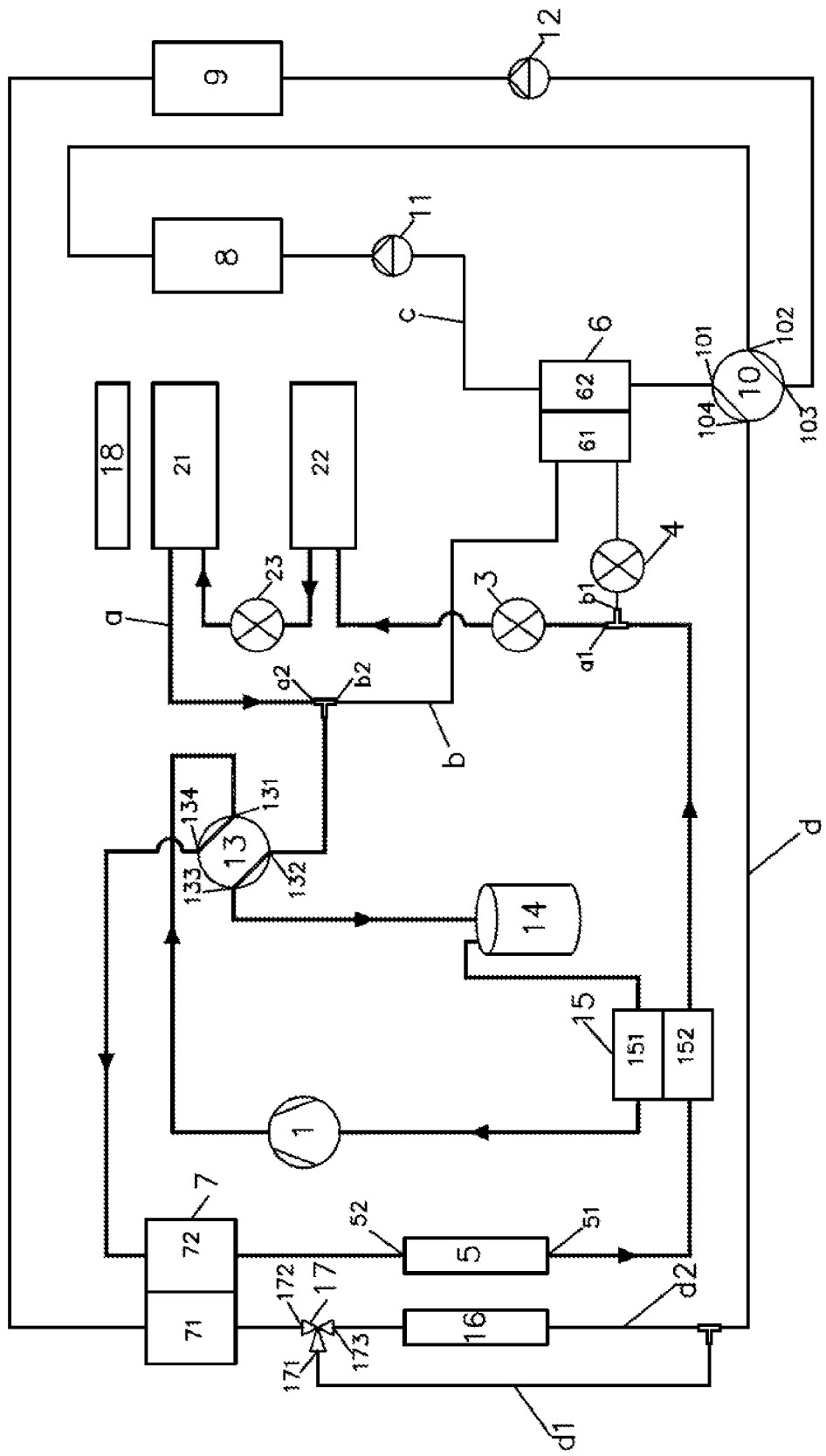
FIG. 14 is a schematic diagram of an exemplary working principle of the thermal management system according to another embodiment of the present application, wherein the third fluid switching device is in a second operating mode.

According to another specific embodiment of the thermal management system of the present application, shown in FIGS. 13 and 14, its structure is basically the same as that of the above embodiment, and its working principle is also substantially the same as that of the above embodiment. The differences are that the indoor heat exchanger 2 includes a first indoor heat exchanger 21 and a second indoor heat exchanger 22; the thermal management system also includes a third flow regulating device 23 connected between the first indoor heat exchanger 21 and the second indoor heat exchanger 22; one end of the first indoor heat exchanger 21 is connected to the second branch b, and the other end of the first indoor heat exchanger 21 is connected to the third flow regulating device 23; and the second indoor heat exchanger 22 is connected between the first flow regulating device 3 and the third flow regulating device 23. The first indoor heat exchanger 21 is located on a downstream side of an air flow relative to the second indoor heat exchanger 22; and the heating device 18 is located on a downstream side of the air flow with respect to the first indoor heat exchanger 21.

When the third fluid switching device 13 is in the first operating mode, the third flow regulating device 23 is in a conducting state or a throttling state. When the third fluid switching device 13 is in the second operating mode, the third flow regulating device 23 is in the conducting state.

Referring to FIG. 13, when the third fluid switching device 13 is in the first operating mode, the first flow regulating device 3 is in the throttling state. When the third flow regulating device 23 is in the conducting state, both the first indoor heat exchanger 21 and the second indoor heat exchanger 22 are used as condensers, and the outdoor heat exchanger 5 is used as an evaporator. Compared with the structure with only one indoor heat exchanger, two indoor heat exchangers can improve the heating capacity. When the third fluid switching device 13 is in the first operating mode, the first flow regulating device 3 is a conducting state or a throttling state. When the third flow regulating device 23 is in the throttling state, the first indoor heat exchanger 21 is used as a condenser, and both the second indoor heat exchanger 22 and the outdoor heat exchanger 5 are used as evaporators. Since the first indoor heat exchanger 21 is located on the downstream side of the air flow relative to the second indoor heat exchanger 22, the water vapor in the passenger compartment air condenses into water droplets due to the action of the second indoor heat exchanger 22 and is discharged from the air conditioning cabinet. The air after dehumidification by the second indoor heat exchanger 22 is heated by the first indoor heat exchanger 21 and then enters the passenger compartment, thereby realizing the heating and dehumidifying mode of the thermal management system.

In this embodiment, the heating and dehumidifying mode is achieved by adjusting the states of the first indoor heat exchanger 21, the second indoor heat exchanger 22, the first flow regulating device 3 and the third flow regulating device 23, without adjusting the flow direction of the refrigerant or turning on the heating device 18 for heating. This reduces the energy loss and fluctuation of the temperature in the passenger compartment caused by the change of refrigerant flow direction, and also reduces the use of heating device 18, reduces the energy consumption of the thermal management system and increases vehicle mileage. Of course, this embodiment can also use the same method as the above embodiment to achieve heating and dehumidifying mode. At this time, the third fluid switching device 13 is in the second operating mode; the first flow regulating device 3 is in the throttling state; the third flow regulating device 23 is in the conducting state; and the heating device 18 is in the heating state.

Referring to FIG. 14, when the third fluid switching device 13 is in the second operating mode, the first flow regulating device 3 is in the throttling state; the third flow regulating device 23 is in the conducting state; both the first indoor heat exchanger 21 and the second indoor heat exchanger 22 are used as evaporators; and the outdoor heat exchanger 5 is used as a condenser. Compared to the structure with only one indoor heat exchanger, two indoor heat exchangers can enhance the cooling capacity. In addition, compared to the two indoor heat exchangers in the related technology, the high-temperature refrigerant enters one of the indoor heat exchangers during the cooling mode, and the solution that the indoor heat exchanger does not exchange heat with the air in the passenger compartment is controlled by the damper, because the present application has no heat leakage from the indoor heat exchanger, which improves the cooling effect.

In this embodiment, the flow state of the coolant circuit and the state of the second flow regulating device 4 are adjusted according to the state of the motor heat exchange assembly 9 and the battery heat exchange assembly 8, and the specific adjustment can be referred to the above embodiment. The design of the operating mode of the thermal management system of this embodiment is the same as that of the above embodiment, which will not be repeated here.

Figure 15:
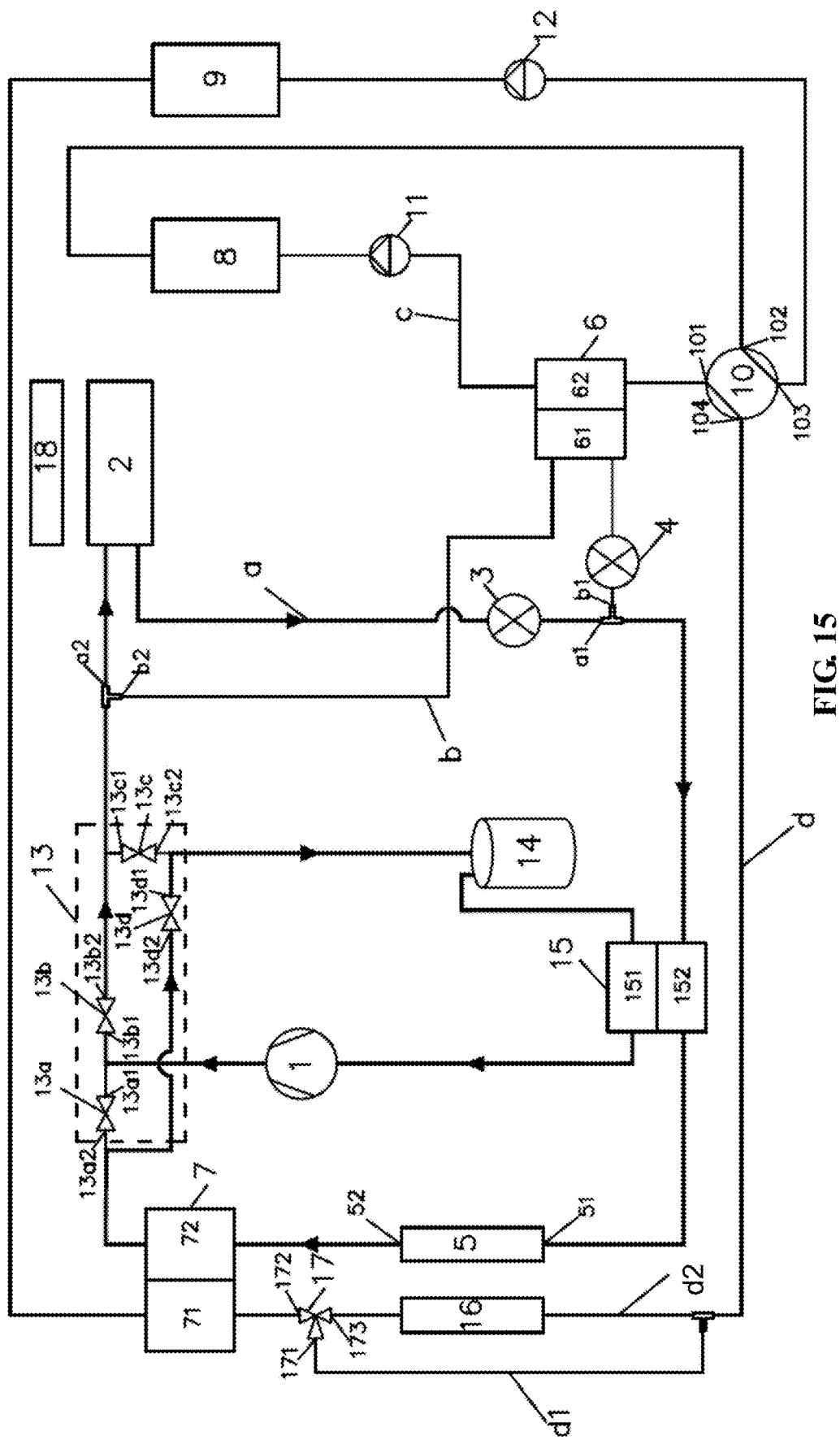
FIG. 15 is a schematic diagram of an exemplary working principle of the thermal management system according to yet another embodiment of the present application, wherein the third fluid switching device is in the first operating mode.
Figure 16:
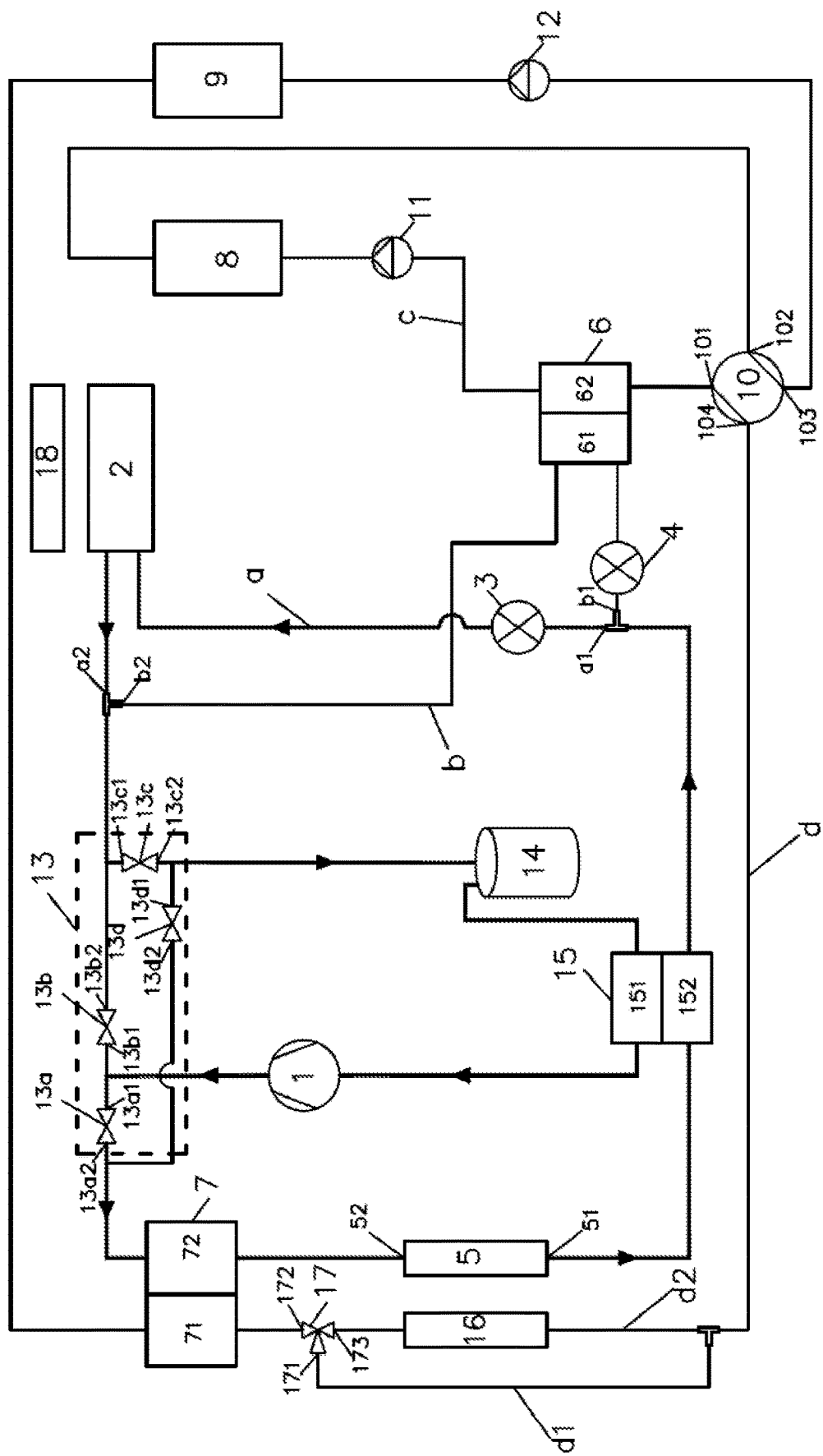
FIG. 16 is a schematic diagram of the thermal management system according to yet another embodiment of the present application, wherein the third fluid switching device is in the second operating mode.

Another specific embodiment of the thermal management system according to the present application, shown in FIGS. 15 and 16, has substantially the same structure as the above embodiment and has substantially the same as working principle as the above embodiment. The differences are that the third fluid switching device 13 consists of a first valve 13a, a second valve 13b, a third valve 13c and a fourth valve 13d. The first valve 13a includes a first end 13a1 of the first valve and a second end 13a2 of the first valve; the second valve 13b includes a first end 13b1 of the second valve and a second end 13b2 of the second valve; the third valve 13c includes a first end 13c1 of the third valve and a second end 13c2 of the third valve; the fourth valve 13d includes a first end 13d1 of the fourth valve and a second end 13d2 of the fourth valve. The first end 13a1 of the first valve is connected to the outlet of the compressor 1 and the first end 13b1 of the second valve; the second end 13a2 of the first valve is connected to the first heat exchange section 72 and the second end 13d2 of the fourth valve; the second end 13b2 of the second valve is connected to the first end 13c1 of the third valve; and the second end a2 of the first branch and the second end b2 of the second branch are connected. The second end 13c2 of the third valve is connected to the inlet of the compressor 1 and the first end 13d1 of the fourth valve. The switching of the refrigerant flow is achieved by adjusting the states of the first valve 13a, the second valve 13b, the third valve 13c and the fourth valve 13d. Optionally, the first valve 13a, the second valve 13b, the third valve 13c and the fourth valve 13d may all be one-way valves.

The common connection port of the first end 13a1 of the first valve and the first end 13b1 of the second valve is the first connection port 131. The common connection port of the second end 13b2 of the second valve and the first end 13c1 of the third valve is the second connection port 132. The common connection port of the second end 13c2 of the third valve and the first end 13d1 of the fourth valve is the third connection port 133. The common connection port of the second end 13a2 of the first valve and the second end 13d2 of the fourth valve is the fourth connection port 134.

Referring to FIG. 15, when the third fluid switching device 13 is in the first operating mode: the first valve 13a is in a cut-off state, the second valve 13b is in a conducting state, the third valve 13c is in a cut-off state, and the fourth valve 13d is in a conducting state. Referring to FIG. 16, when the third fluid switching device 13 in the second operating mode: the first valve 13a is in a conducting state, the second valve 13b is in a cut-off state, the third valve 13c is in a conducting state, and the fourth valve 13d is in a cut-off state.

In some embodiments, the first valve 13a and the second valve 13b can be designed as an integral part, the third valve 13c and the fourth valve 13d can be designed as an integral part, and the first flow regulating device 3 and the second flow regulating device 4 can be designed as an integral part, so as to achieve the purpose of reducing the number of components of the thermal management system and simplify the pipeline design. In some embodiments, the first valve 13a, the second valve 13b, the third valve 13c and the fourth valve 13d are designed as an integral part to further simplify the pipeline design.

In this embodiment, the flow state of the refrigerant circuit, the flow state of the coolant circuit and the state of the second flow regulating device 4 are adjusted according to the state of the passenger compartment, the motor heat exchange assembly 9 and the battery heat exchange assembly 8, in a manner that can be referred to the above embodiment. The design of the operating mode of the thermal management system of this embodiment is the same as that of the above embodiment, which will not be repeated here.

The "connection" between two components in this application can be a direct connection or a connection through a pipeline. Only the pipeline may be provided between the two components, or valves or other components may also be provided between the two components. Similarly, the "communication" between two components in this application can be a direct communication, or a communication through a pipeline. Only the pipeline may be provided between the two components, or valves or other components may also be provided between the two components.

The foregoing is only preferred embodiments of the present application and is not intended to limit the present application in any way. Although this application has been disclosed as preferred embodiments, it is not intended to limit this application. Those of ordinary skill in the art can use the technical content disclosed above to make some changes or modifications to equivalent embodiments without departing from the scope of the technical solutions of this application. However, any simple modifications, equivalent changes and modifications to the above embodiments based on the technical substance of the present application, without departing from the content of the technical solutions of the present application, still fall within the scope of the technical solutions of the present application.

What is claimed is:

1. A thermal management system, comprising:
a refrigerant system and a coolant system;
the refrigerant system comprising a compressor, an indoor heat exchanger, a first flow regulating device, a first heat exchanger and an outdoor heat exchanger; the outdoor heat exchanger comprising a first port of the outdoor heat exchanger and a second port of the outdoor heat exchanger; the first flow regulating device having a bi-directional throttling function;
the first heat exchanger comprising a first heat exchange section and a second heat exchange section which are not communicated, the first heat exchange section and the second heat exchange section being configured to exchange heat;
the thermal management system comprising a heating mode and a cooling mode; in the heating mode, an outlet of the compressor, the indoor heat exchanger, the first flow regulating device, the outdoor heat exchanger, the first heat exchange section, and an inlet of the compressor being communicated to form a first refrigerant circuit, the first flow regulating device being in a refrigerant throttling state, and a refrigerant in the first heat exchange section absorbing heat from a coolant in the second heat exchange section; in the cooling mode, the outlet of the compressor, the first heat exchange section, the outdoor heat exchanger, the first flow regulating device, the indoor heat exchanger, and the inlet of the compressor being communicated to form a second refrigerant circuit, the first flow regulating device being in a refrigerant throttling state, and the heat of the refrigerant in the first heat exchange section being transferred to the coolant in the second heat exchange section.

2. The thermal management system according to claim 1, further comprising a second flow regulating device and a second heat exchanger; the second flow regulating device having a bi-directional throttling function; the second heat exchanger comprising a third heat exchange section and a fourth heat exchange section which are not communicated; the third heat exchange section being connected in the refrigerant system, the fourth heat exchange section being connected in the coolant system, the refrigerant of the refrigerant system and the coolant of the coolant system being configured to exchange heat through the third heat exchange section and the fourth heat exchange section;
- a first branch and a second branch set in parallel with each other being provided between the compressor and the outdoor heat exchanger; the first flow regulating device and the indoor heat exchanger being connected in the first branch; the second flow regulating device and third heat exchanger being connected in the second branch; the first branch comprising a first end of the first branch and a second end of the first branch; the second branch comprising a first end of the second branch and a second end of the second branch;
- the first end of the first branch and the first end of the second branch communicating with the first port of the outdoor heat exchanger; the second port of the outdoor heat exchanger communicating with the first heat exchange section; the first heat exchange section communicating with the outlet of the compressor; the second end of the first branch and the second end of the second branch communicating with the inlet of the compressor, or, the second end of the first branch and the second end of the second branch communicating with the outlet of the compressor; and the first heat exchange section communicating with the inlet of the compressor.

3. The thermal management system according to claim 2, wherein the coolant system comprises a first flow path, a second flow path and a first fluid switching device; the first flow path and the second flow path are connected to the first fluid switching device; the first flow path is provided with a battery heat exchange assembly and a first fluid driving device; the fourth heat exchange section is connected to the first flow path; the second flow path is provided with a motor heat exchange assembly and a second fluid driving device;
- wherein the first fluid switching device comprises a first port, a second port, a third port and a fourth port; the first fluid switching device has a first communicating state and a second communicating state; when the first fluid switching device is in the first communicating state, the first port communicates with the second port, the third port communicates with the fourth port, the first fluid driving device, the first fluid switching device, the fourth heat exchange section and the battery heat exchange assembly are communicated to form a first coolant circuit, the coolant in the first coolant circuit is configured to exchange heat with the refrigerant of the refrigerant system through the second heat exchanger, the second fluid driving device, the motor heat exchange assembly, the second heat exchange section and the first fluid switching device are communicated to form a second coolant circuit, and the coolant in the second coolant circuit is configured to exchange heat with the refrigerant of the refrigerant system through the first heat exchanger; and
- wherein when the first fluid switching device is in the second communicating state, the first port communicates with the fourth port, the second port communicates with the third port the second fluid driving device, the motor heat exchange assembly, the second heat exchange section, the first fluid switching device, the fourth heat exchange section, the battery heat exchange assembly, and first fluid driving device are communicated to form a same coolant circulation circuit, the coolant of the coolant system is configured to exchange heat with the refrigerant of the refrigerant system through the first heat exchanger, and the coolant of the coolant system is configured to exchange heat with the refrigerant of the refrigerant system through the second heat exchanger and the first heat exchanger.

4. The thermal management system according to claim 3, wherein the coolant system further comprises a third heat exchanger and a second fluid switching device; the second fluid switching device comprises a fifth port, a sixth port and a seventh port; the sixth port communicates with the fifth port or the seventh port;
- the second flow path comprises a third branch and a fourth branch; the third heat exchanger is connected in the fourth branch; the third branch is connected between the fourth port and the fifth port; the fourth branch is connected between the fourth port and the seventh port; the second heat exchange section is connected between the sixth port and the motor heat exchange assembly.

5. The thermal management system according to claim 4, wherein the thermal management system comprises a first heat dissipation mode and a second heat dissipation mode;
- in the first heat dissipation mode, the compressor is in an off state; the first fluid switching device is in the first communicating state; the sixth port of the second fluid switching device communicates with the seventh port; the second fluid driving device, the motor heat exchange assembly, the second heat exchange section and the third heat exchanger are communicated to form a coolant circuit;
- in the second heat dissipation mode, the compressor is in an off state; the first fluid switching device is in the second communicating state; the sixth port of the second fluid switching device communicates with the seventh port; the second fluid driving device, the motor heat exchange assembly, the second heat exchange section, the third heat exchanger, the fourth heat exchange section, the battery heat exchange assembly and the first fluid driving device are communicated to form a coolant circuit.

6. The thermal management system according to claim 2, further comprising a third fluid switching device, the third fluid switching device comprising a first connection port, a second connection port, a third connection port and a fourth connection port; the first connection port being connected to the outlet of the compressor; the second end of the first branch and the second end of the second branch being connected to the second connection port; the third connection port being connected to the inlet of the compressor; and the fourth connection port being connected to the first heat exchange section;
- wherein the third fluid switching device comprises a first operating mode and a second operating mode; in the first operating mode, the first connection port communicates with the second connection port, and the third connection port communicates with the fourth connection port; in the second operating mode, the first connection port communicates with the fourth connection port, and the second connection port communicates with the third connection port.

7. The thermal management system according to claim 6, wherein the third fluid switching device comprises a first valve a second valve, a third valve and a fourth valve; the first valve comprises a first end of the first valve and a second end of the first valve; the second valve comprises a first end of the second valve and a second end of the second valve; the third valve comprises a first end of the third valve and a second end of the third valve; the fourth valve comprises a first end of the fourth valve and a second end of the fourth valve; the first end of the first valve is connected to the outlet of the compressor and the first end of the second valve; the second end of the first valve is connected to the first heat exchange section and the second end of the fourth valve; the second end of the second valve is connected to the first end of the third valve, and connected to the second end of the first branch and the second end of the second branch; the second end of the third valve is connected to the inlet of the compressor and the first end of the fourth valve;

in the first operating mode of the third fluid switching device: the first valve is in a cut-off state, the second valve is in a conducting state, the third valve is in a cut-off state, and the fourth valve is in a conducting state; and in the second operating mode of the third fluid switching device: the first valve is in a conducting state, the second valve is in a cut-off state, the third valve is in a conducting state, and the fourth valve is a cut-off state.

8. The thermal management system according to claim 2, wherein the thermal management system further comprises: a first heating mode and a second heating mode;

in the first heating mode, the second port of the outdoor heat exchanger communicates with the inlet of the compressor; the second end of the first branch and the second end of the second branch communicate with the outlet of the compressor; the first flow regulating device and the second flow regulating device are in a throttling state; the compressor, the indoor heat exchanger, the first flow regulating device, the outdoor heat exchanger and the first heat exchange section are communicated to form the first refrigerant circuit; and the compressor, the third heat exchange section, the second flow regulating device, the outdoor heat exchanger and the first heat exchange section are communicated to form a third refrigerant circuit; and in the second heating mode, the second port of the outdoor heat exchanger communicates with the inlet of the compressor; the second end of the first branch communicates with the outlet of the compressor; the first flow regulating device is in a throttling state; the second flow regulating device is in a cut-off state; the compressor, the indoor heat exchanger, the first flow regulating device, the outdoor heat exchanger and the first heat exchange section are communicated to form the first refrigerant circuit.

9. The thermal management system according to claim 2, wherein the thermal management system comprises a first cooling mode and a second cooling mode;

in the first cooling mode, the second port of the outdoor heat exchanger communicates with the outlet of the compressor; the second end of the first branch and the second end of the second branch communicate with the inlet of the compressor; the first flow regulating device and the second flow regulating device are in a throttling state; the compressor, the first heat exchange section, the outdoor heat exchanger, the first flow regulating device and the indoor heat exchanger are communicated to form the second refrigerant circuit; and the compressor, the first heat exchange section, the outdoor heat exchanger, the second flow regulating device and the third heat exchange section are communicated to form a fourth refrigerant circuit;

in the second cooling mode, the second port of the outdoor heat exchanger communicates with the outlet of the compressor; the second end of the first branch communicates with the inlet of the compressor; the first flow regulating device is in a throttling state; the second flow regulating device is in a cut-off state; the compressor, the first heat exchange section, the outdoor heat exchanger, the first flow regulating device and the indoor heat exchanger are communicated to form the second refrigerant circuit.

10. The thermal management system according to claim 2, further comprising a heating device, the heating device being located on a downstream side of an air flow with respect to the indoor heat exchanger, the thermal management system comprising a heating and dehumidifying mode; wherein in the heating and dehumidifying mode:

the second port of the outdoor heat exchanger communicates with the outlet of the compressor; the second end of the first branch communicates with the inlet of the compressor; the first flow regulating device is in a throttling state; the heating device is in a heating state; the compressor, the first heat exchange section, the outdoor heat exchanger, the first flow regulating device and the indoor heat exchanger are communicated to form the second refrigerant circuit.

11. The thermal management system according to claim 2, further comprising a heating device provided adjacent to the indoor heat exchanger, the heating device being located on a downstream side of an air flow with respect to the indoor heat exchanger, the thermal management system comprising a defrosting mode; wherein in the defrosting mode:

the second port of the outdoor heat exchanger communicates with the outlet of the compressor; the second end of the second branch communicates with the inlet of the compressor; the first flow regulating device is in a cut-off state; the second flow regulating device is in a throttling state; the heating device is in a heating state; the compressor, the first heat exchange section, the outdoor heat exchanger, the second flow regulating device and the third heat exchange section are communicated to form a fourth refrigerant circuit, and the coolant system is in operation.

12. The thermal management system according to claim 2, further comprising a gas-liquid separation device, the gas-liquid separation device comprising a fourth heat exchanger and a gas-liquid separator;

wherein the fourth heat exchanger is provided separately from the gas-liquid separator; the fourth heat exchanger comprises a fifth heat exchange section and a sixth heat exchange section; the fifth heat exchange section and the sixth heat exchange section are connected in the refrigerant system; the fifth heat exchange section and the sixth heat exchange section are configured to exchange heat; the fifth heat exchange section is connected between the inlet of the compressor and an outlet of the gas-liquid separator; the sixth heat exchange section is connected between the first port of the outdoor heat exchanger and the first end of the first branch; the sixth heat exchange section is connected between the first port of the outdoor heat exchanger and the first end of the second branch; an inlet of the gas-liquid separator communicates with the first heat exchange section, or, communicates with the second end of the first branch and the second end of the second branch.

13. The thermal management system according to claim 2, further comprising a gas-liquid separation device, the gas-liquid separation device comprising a fourth heat exchanger and a gas-liquid separator;
wherein the fourth heat exchanger is at least partially located inside the gas-liquid separator; the fourth heat exchanger comprises a fifth heat exchange section and a sixth heat exchange section; the fifth heat exchange section and the sixth heat exchange section are connected in the refrigerant system; the fifth heat exchange section and the sixth heat exchange section are capable of performing heat exchange; the sixth heat exchange section is connected between the first port of the outdoor heat exchanger and the first end of the first branch; the sixth heat exchange section is connected between the first port of the outdoor heat exchanger and the first end of the second branch; the outlet of the gas-liquid separator is connected to the inlet of the compressor; the inlet of the gas-liquid separator is connected to the first heat exchange section, or connected to the second end of the first branch and the second end of the second branch; the fifth heat exchange section is part of the gas-liquid separator; and the sixth heat exchange section is fixedly connected to the gas-liquid separator.

14. The thermal management system according to claim 1, wherein the indoor heat exchanger comprises a first indoor heat exchanger and a second indoor heat exchanger; the refrigerant system comprises a third flow regulating device connected in series between the first indoor heat exchanger and the second indoor heat exchanger; one end of the first indoor heat exchanger is connected to the inlet or the outlet of the compressor, and another end of the first indoor heat exchanger is connected to the third flow regulating device; and the second indoor heat exchanger is connected between the first flow regulating device and the third flow regulating device.

15. The thermal management system according to claim 14, wherein the thermal management system comprises a heating and dehumidifying mode; in the heating and dehumidifying mode:
the first heat exchange section communicates with an inlet of the compressor; a port of the first indoor heat exchanger communicates with the outlet of the compressor; the first flow regulating device is a conducting state; the third flow regulating device is in a throttling state; the compressor, the first indoor heat exchanger, the third flow regulating device, the second indoor heat exchanger, the first flow regulating device and the outdoor heat exchanger are communicated to form a fifth refrigerant circuit.

16. The thermal management system according to claim 14, wherein:
in the heating mode, the first heat exchange section communicates with the inlet of the compressor; the inlet of the first indoor heat exchanger communicates with the outlet of the compressor; the first flow regulating device is in a throttling state; the third flow regulating device is in a conducting state; the compressor, the first indoor heat exchanger, the third flow regulating device, the second indoor heat exchanger, the first flow regulating device, the outdoor heat exchanger and the first heat exchange section are communicated to form the first refrigerant circuit;
in the cooling mode, the first heat exchange section communicates with the outlet of the compressor; the outlet of the first indoor heat exchanger communicates with the inlet of the compressor; the first flow regulating device is in a throttling state; the third flow regulating device is in a conducting state; the compressor, the first heat exchange section, the outdoor heat exchanger, the first flow regulating device, the first indoor heat exchanger, the third flow regulating device and the second indoor heat exchanger are communicated to form the second refrigerant circuit.

17. A control method of a thermal management system, the thermal management system comprising a refrigerant system and a coolant system;
the refrigerant system comprising a compressor, an indoor heat exchanger, a first flow regulating device, a first heat exchanger and an outdoor heat exchanger; the outdoor heat exchanger comprising a first port of the outdoor heat exchanger and a second port of the outdoor heat exchanger; the first flow regulating device having a bi-directional throttling function;
the first heat exchanger comprising a first heat exchange section and a second heat exchange section which are not communicated, the first heat exchange section and the second heat exchange section being configured to exchange heat;
the control method comprising controlling the thermal management system to work on a heating mode and a cooling mode;
wherein in the heating mode, an outlet of the compressor, the indoor heat exchanger, the first flow regulating device, the outdoor heat exchanger, the first heat exchange section, and an inlet of the compressor being communicated to form a first refrigerant circuit, the first flow regulating device being in a refrigerant throttling state, and a refrigerant in the first heat exchange section absorbing heat from a coolant in the second heat exchange section;
in the cooling mode, the outlet of the compressor, the first heat exchange section, the outdoor heat exchanger, the first flow regulating device, the indoor heat exchanger, and the inlet of the compressor being communicated to form a second refrigerant circuit, the first flow regulating device being in a refrigerant throttling state, and the heat of the refrigerant in the first heat exchange section being transferred to the coolant in the second heat exchange section.

18. A vehicle thermal management system, comprising:
a refrigerant subsystem comprising a compressor, an indoor heat exchanger, a fluid switching device being used to change a flow direction of a refrigerant in the refrigerant subsystem, a bi-directional throttling valve being used to throttle the refrigerant in the refrigerant subsystem, and an outdoor heat exchanger; the compressor, the indoor heat exchanger, the fluid switching device, the bi-directional throttling valve, and the outdoor heat exchanger being connected and being in fluid communication relationship for circulating the refrigerant;
the vehicle thermal management system being configured in a heating mode or a cooling mode;
wherein the heating mode and the cooling mode shares the same bi-directional throttling valve.

19. The vehicle thermal management system according to claim 18, further comprising an air-cooled PTC electric heater;
the indoor heat exchanger being used as a condenser in the heating mode, and the indoor heat exchanger being used as an evaporator in the cooling mode.

20. The vehicle thermal management system according to claim 18, further comprising a coolant subsystem, the coolant subsystem comprising a water pump and a third heat exchanger in line communication relationship for circulating a coolant, the third heat exchanger and the outdoor heat exchanger being assembled as a front-end module;

wherein the vehicle thermal management system comprises a first heat exchanger comprising a first heat exchange portion and a second heat exchange portion, the refrigerant subsystem comprises the first heat exchange portion, the coolant subsystem comprises the second heat exchange portion, the first heat exchanger is suitable for heat exchanging the refrigerant in the first heat exchange portion with the coolant in the second heat exchange portion.

* * * * *